US011180993B2

(12) United States Patent
Niederriter et al.

(10) Patent No.: US 11,180,993 B2
(45) Date of Patent: *Nov. 23, 2021

(54) IMPACT EVENT LOGGING SYSTEM AND METHOD FOR LONGWALL SHEARER

(71) Applicant: Joy Global Underground Mining LLC, Warrendale, PA (US)

(72) Inventors: Edward F. Niederriter, Fryburg, PA (US); Jeffrey A. Ley, Cranberry, PA (US)

(73) Assignee: JOY GLOBAL UNDERGROUND MINING LLC, Warrendale, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/795,192

(22) Filed: Feb. 19, 2020

(65) Prior Publication Data
US 2021/0254463 A1     Aug. 19, 2021

(51) Int. Cl.
| | |
|---|---|
| *E21C 35/24* | (2006.01) |
| *G01M 7/00* | (2006.01) |
| *E21C 35/12* | (2006.01) |
| *E02F 9/26* | (2006.01) |
| *E21C 27/02* | (2006.01) |
| *G06F 11/32* | (2006.01) |

(52) U.S. Cl.
CPC ............... *E21C 35/24* (2013.01); *G01M 7/00* (2013.01); *E02F 9/267* (2013.01); *E21C 27/02* (2013.01); *E21C 35/12* (2013.01); *G06F 11/32* (2013.01)

(58) Field of Classification Search
CPC ...................................................... E21C 35/24
See application file for complete search history.

(56) References Cited

U.S. PATENT DOCUMENTS

| | | | |
|---|---|---|---|
| 2,620,386 A | 12/1952 | Alspaugh et al. | |
| 4,143,552 A * | 3/1979 | Godfrey | G01N 29/12 73/579 |
| 4,367,900 A | 1/1983 | Trumper | |

(Continued)

OTHER PUBLICATIONS

Komatsu, J525 Ranging Arm RCA, PowerPoint Presentation Slide from Sep. 18, 2019 (1 page).

(Continued)

*Primary Examiner* — Janine M Kreck
(74) *Attorney, Agent, or Firm* — Michael Best & Friedrich LLP

(57) ABSTRACT

Methods and systems of monitoring and controlling a longwall mining system. One system includes a shearer including a cutter drum and a sensor mounted to the shearer. The system also includes an electronic controller including a processor and a memory. The electronic controller is configured to receive an impact event indication associated with an impact event of the cutter drum, the impact event indication based on vibration data collected by the sensor. The electronic controller is also configured to retrieve additional data associated with the impact event indication and link the additional data with the vibration data of the impact event indication. The electronic controller is also configured to create and store an impact event record including the vibration data and the additional data. The electronic controller is configured to, in response to receiving a maintenance request, export the impact event record for display.

13 Claims, 16 Drawing Sheets

(56) References Cited

U.S. PATENT DOCUMENTS

| | | | |
|---|---|---|---|
| 4,884,847 A * | 12/1989 | Bessinger | E21C 35/24 |
| | | | 299/1.05 |
| 4,968,098 A | 11/1990 | Hirsch et al. | |
| 4,981,327 A | 1/1991 | Bessinger et al. | |
| 6,062,650 A | 5/2000 | Smith et al. | |
| 6,132,005 A | 10/2000 | Mazlin et al. | |
| 7,177,709 B2 | 2/2007 | Uhlendorf et al. | |
| 9,903,090 B2 | 2/2018 | Daniel et al. | |
| 2008/0185903 A1 | 8/2008 | Bausov et al. | |
| 2010/0063691 A1 | 3/2010 | Hail et al. | |
| 2016/0362980 A1 | 12/2016 | Knuth | |
| 2019/0211533 A1 | 7/2019 | White | |

OTHER PUBLICATIONS

Co-Pending U.S. Appl. No. 16/795,173, filed Feb. 19, 2020 (51 pages including statement of relevance).
Co-Pending U.S. Appl. No. 16/795,184, filed Feb. 19, 2020 (51 pages including statement of relevance).
Co-Pending U.S. Appl. No. 16/795,200, filed Feb. 19, 2020 (51 pages including statement of relevance).

* cited by examiner

IMPACT EVENT LOGGING SYSTEM AND METHOD FOR LONGWALL SHEARER

FIELD

Embodiments described herein relate to a longwall mining system, and, more particularly, to controlling and monitoring a longwall mining system based on vibration data.

BACKGROUND

Longwall mining begins with identifying a material seam to be mined and "blocking out" the seam into panels by excavating roadways around the perimeter of each panel. During excavation of the seam (for example, extraction of coal), select pillars of material may be left unexcavated between adjacent panels to assist in supporting an overlying geological strata. The material panels are excavated by a longwall mining system, which includes components such as automated electro-hydraulic roof supports, a material shearing machine (i.e., a longwall shearer), and an armored face conveyor ("AFC") parallel to the material face. As the shearer travels the width of the material face to remove a layer or web of material, the roof supports are controlled to advance to support the roof of the newly exposed section of geological strata. The AFC is then advanced by the roof supports toward the material face by a distance equal to the depth of the material layer previously removed by the shearer. Advancing the AFC toward the material face in such a manner allows the shearer to engage with the material face and continue shearing material away from the material face.

SUMMARY

Longwall mining systems may be used to mine or extract a material or mineral, such as coal or ore. However, in some applications, a longwall mining system may encounter or be used to extract a hard material or stone. For example, the shearer may cut hard material intrusions in the seam, adjacent to the seam, or a combination thereof. Cutting a hard material may result in damage to a cutter drum of the shearer, such as one or more cutting picks, cutting pick holders, and the like. When a cutter drum experiences damage, the cutter drum imparts large vibrations onto the shearer, which may result in additional damage. These vibrations often become worse at faster speeds. For example, instances of large vibrations (also referred to as impact loads or events) in the large bearings that support the cutter drums of the shearer may lead to failure of those bearings (for example, brinelling of the bearings), the ranging arm cutter gearcase, another component of the shearer, or a combination thereof.

To solve these and other problems, embodiments described herein provide methods and systems for monitoring and controlling a longwall mining system based on vibration data. The embodiments described herein detect and monitor vibration data and impact events to improve reliability, operation, reporting, maintenance, and the like for the longwall mining system. Understanding the impacts and vibrations experienced by a shearer (for example, when an impact event occurred, where the impact event occurred, how large the impact event was, and the like) may lead to improved reliability, operation, and maintenance of the longwall mining system. Alternatively or in addition, when remotely operating the shearer, an operator may find it difficult to accurately and efficiently identify when the shearer begins to cut out-of-seam. When the shearer cuts out-of-seam, the shearer may begin cutting a different material and, thus, experience a change in vibration. Accordingly, by analyzing and monitoring a vibration level experienced by the shearer, an operator (or a longwall control system) may be able to more accurately and efficiently identify when the shearer cuts out-of-seam and how to adjust a cutting parameter such that the shearer returns to cutting in seam.

Accordingly, embodiments described herein provide for, among other things, monitoring and controlling a longwall mining system based on vibration data by controlling a cutting parameter of a shearer, detecting an impact event, providing an impact event record of the shearer, maintaining a cutting drum within a target material seam, or a combination thereof.

For example, one embodiment provides a longwall mining system. The system includes a shearer including a cutter drum and a sensor mounted to the shearer. The system also includes an electronic controller including a processor and a memory, the electronic controller communicatively coupled to the sensor. The electronic controller is configured to receive vibration data from the sensor and determine a current vibration level associated with the shearer based on the vibration data. The electronic controller is also configured to compare the current vibration level to a vibration threshold. The electronic controller is also configured to, in response to the current vibration level exceeding the vibration threshold, adjust a cutting parameter for the cutter drum of the shearer. The electronic controller is also configured to control the cutter drum with the adjusted cutting parameter.

Another embodiment provides a method of controlling a longwall mining system. The method including receiving, with an electronic controller, vibration data from a sensor mounted to a shearer. The method also includes determining, with the electronic controller, a current vibration level associated with the shearer based on the vibration data. The method also includes comparing, with the electronic controller, the current vibration level to a vibration threshold. The method also includes in response to the current vibration level exceeding the vibration threshold, adjusting, with the electronic controller, a cutting parameter for a cutter drum of the shearer. The method also includes controlling, with the electronic controller, the cutter drum with the adjusted cutting parameter.

Yet another embodiment provides a longwall mining system. The system includes a shearer including a cutter drum and a sensor mounted to the shearer. The system also includes an electronic controller including a processor and a memory, the electronic controller communicatively coupled to the sensor. The electronic controller is configured to receive vibration data from the sensor and determine a current vibration level experienced by a cutter drum of the shearer based on the vibration data. The electronic controller is also configured to compare the current vibration level to a vibration threshold. The electronic controller is also configured to detect an impact event associated with the cutter drum of the shearer based on the comparison and generate an impact event indication associated with the impact event.

Yet another embodiment provides a method of monitoring a longwall mining system. The method incudes receiving, from an electronic controller, vibration data from a sensor mounted to a shearer. The method also includes determining, with the electronic controller, a current vibration level experienced by a cutter drum of the shearer based on the vibration data. The method also includes comparing, with the electronic controller, the current vibration level to a vibration threshold. The method also includes detecting, with the electronic controller, an impact event associated with the cutter drum of the shearer based on the comparison. The method also includes generating, with the electronic controller, an impact event indication associated with the impact event.

Yet another embodiment provides a longwall mining system. The system includes a shearer including a cutter drum and a sensor mounted to the shearer. The system also includes an electronic controller including a processor and a memory, the electronic controller communicatively coupled to the sensor. The electronic controller is configured to receive an impact event indication associated with an impact event of the cutter drum, the impact event indication based on vibration data collected by the sensor. The electronic controller is also configured to retrieve additional data associated with the impact event indication and link the additional data with the vibration data of the impact event indication. The electronic controller is also configured to create an impact event record, the impact event record including the vibration data and the additional data. The electronic controller is also configured to store the impact event record, and, in response to receiving a maintenance request, export the impact event record for display.

Yet another embodiment provides a method of monitoring a longwall mining system. The method includes receiving, with an electronic controller, an impact event indication associated with an impact event of a cutter drum of a shearer, the impact event indication based on vibration data collected by a sensor mounted to the shearer. The method also includes retrieving, with the electronic controller, additional data associated with the impact event indication. The method also includes linking, with the electronic controller, the additional data with the vibration data of the impact event indication. The method also includes creating, with the electronic controller, an impact event record, the impact event record including the vibration data and the additional data. The method also includes storing, with the electronic controller, the impact event record. The method also includes, in response to receiving a maintenance request, exporting, with the electronic controller, the impact event record for display.

Yet another embodiment provides a longwall mining system. The system includes a shearer including a cutter drum and a sensor mounted to the shearer. The system also includes an electronic controller including a processor and a memory, the electronic controller communicatively coupled to the sensor. The electronic controller is configured to receive vibration data from the sensor and determine a current vibration level experienced by the cutter drum based on the vibration data. The electronic controller is also configured to compare the current vibration level to a target vibration threshold associated with a target material seam. The electronic controller is also configured to provide a visual output to an operator of the longwall mining system when the current vibration level exceeds the target vibration threshold, wherein the current vibration level exceeds the target vibration threshold when the cutter drum of the shearer cuts outside of the target material seam.

Yet another embodiment provides a method of monitoring a longwall mining system. The method includes receiving, with an electronic controller, vibration data from a sensor mounted to a shearer. The method also includes determining, with the electronic controller, a current vibration level experienced by a cutter drum of the shearer based on the vibration data. The method also includes comparing, with the electronic controller, the current vibration level to a target vibration threshold associated with a target material seam. The method also includes providing, with the electronic controller, a visual output to an operator of the longwall mining system when the current vibration level exceeds the target vibration threshold, wherein the current vibration level exceeds the target vibration threshold when the cutter drum of the shearer cuts outside of the target material seam.

Other aspects of the embodiments will become apparent by consideration of the detailed description and accompanying drawings.

DETAILED DESCRIPTION

The present application includes description of various embodiments including details of construction and arrangement of components set forth in the following description and in the accompanying drawings. However, the particular constructions and arrangements of the embodiments described and shown herein are example constructions and arrangements, and the application encompasses additional constructions and arrangements of the embodiments and additional ways of practicing and carrying out the embodiments.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and may include electrical connections or couplings, whether direct or indirect. Also, electronic communications and notifications may be performed using any known means including direct connections, wireless connections, etc.

A plurality of hardware and software based devices, as well as a plurality of different structural components may be utilized to implement the embodiments described herein. In addition, embodiments described herein may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects of the embodiments described herein may be implemented in software (for example, stored on non-transitory computer-readable medium) executable by one or more processors. As such, it should be noted that a plurality of hardware and software based devices, as well as a plurality of different structural components, may be utilized to implement the embodiments described herein. For example, "mobile device," "computing device," and "server" as described in the specification may include one or more electronic processors, one or more memory modules including non-transitory computer-readable medium, one or more input/output interfaces, and various connections (for example, a system bus) connecting the components.

Figure 1:
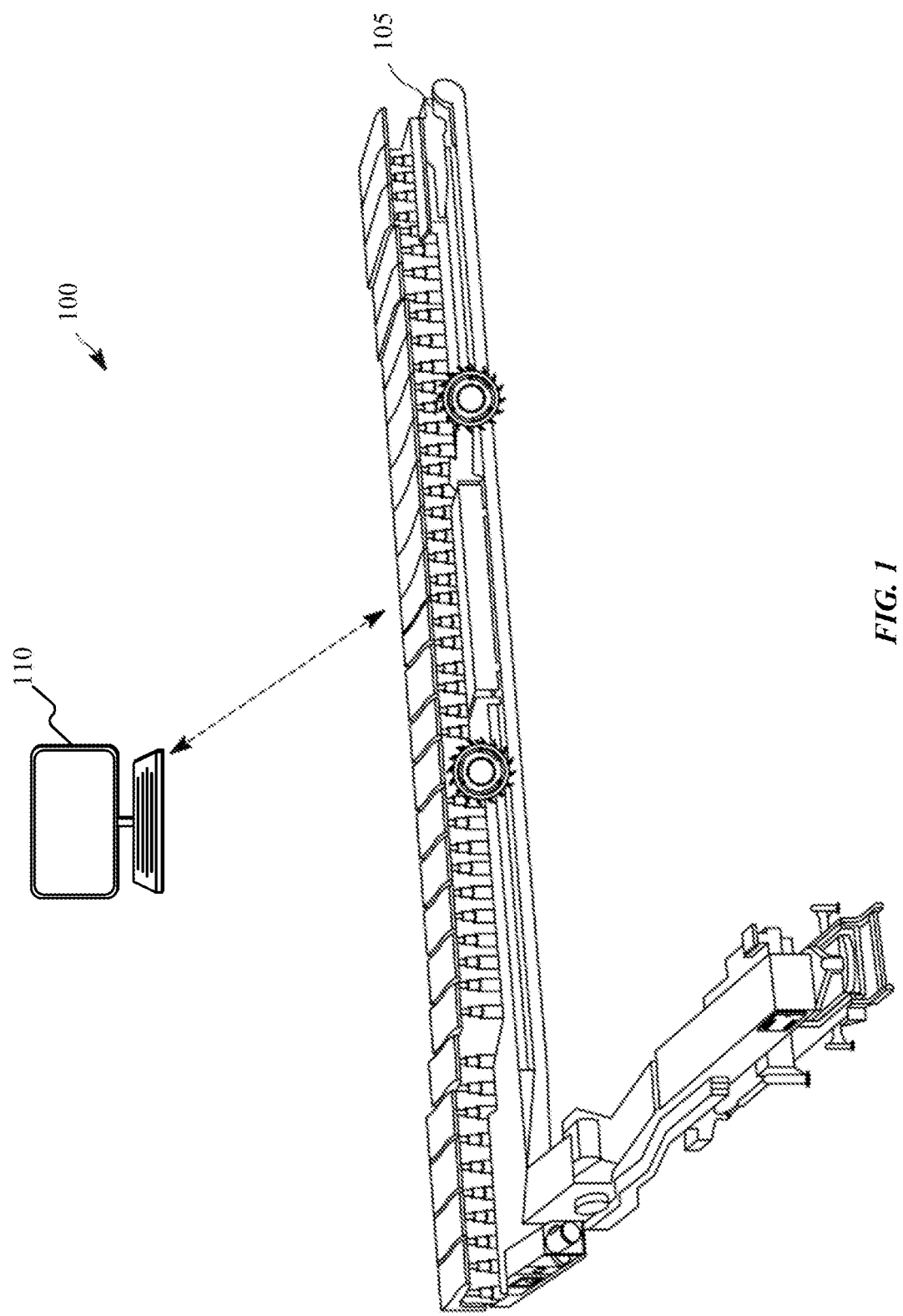
FIG. 1 illustrates an extraction system according to some embodiments.

FIG. 1 illustrates an extraction system 100. The extraction system 100 includes a longwall mining system 105 and a mine monitoring system 110. The extraction system 100 is configured to extract a material or product (for example, coal, ore, or another mineral) from a mine in an efficient manner. The longwall mining system 105 physically extracts material from an underground mine. The mine monitoring system 110 monitors the operation of the longwall mining system 105 to, for example, ensure that the extraction of material remains efficient, detect equipment problems, and the like. The mine monitoring system 110 may include one or more computer systems (e.g., personal computers, laptops, smart phones, tablets, and the like) that may be located locally at the mine, whether underground or above ground, one or more computer systems that may be located remotely from the mine, or a combination thereof. The mine monitoring system 110 may communicate with the longwall mining system 105 via a communication network including one or more wired and wireless portions. The communication network may include a short range network, for example, a Bluetooth® network, a Wi-Fi network, or the like to provide a connection between the longwall mining system 105 and the mine monitoring system 110 on a local network. In some embodiments, the longwall mining machine communicates via a short range network to network infrastructure (e.g., routers, hubs, and the like) of a long range network or wide area network (e.g., the Internet, a cellular network (e.g., 3G, long term evolution (LTE), 5G), or the like), and the mine monitoring system 110 similarly has a network connection to the long range network or wide area network. In some embodiments, the mine monitoring system 110 includes one or more cloud-based servers in communication (e.g., via the Internet or another wide area network) with client devices (e.g., personal computers, laptops, smart phones, tablets, and the like) of mine operator personnel located locally at the mine, located remotely from the mine, or both. As noted above, longwall mining begins with identifying a material seam to be extracted, then "blocking out" the seam into material panels by excavating roadways around the perimeter of each panel. During excavation of the seam (i.e., extraction of coal), select pillars of material may be left unexcavated between adjacent material panels to assist in supporting the overlying geological strata. The material panels are excavated by the longwall mining system 105, and the extracted material is transported to the surface of the mine.

Figure 2A:
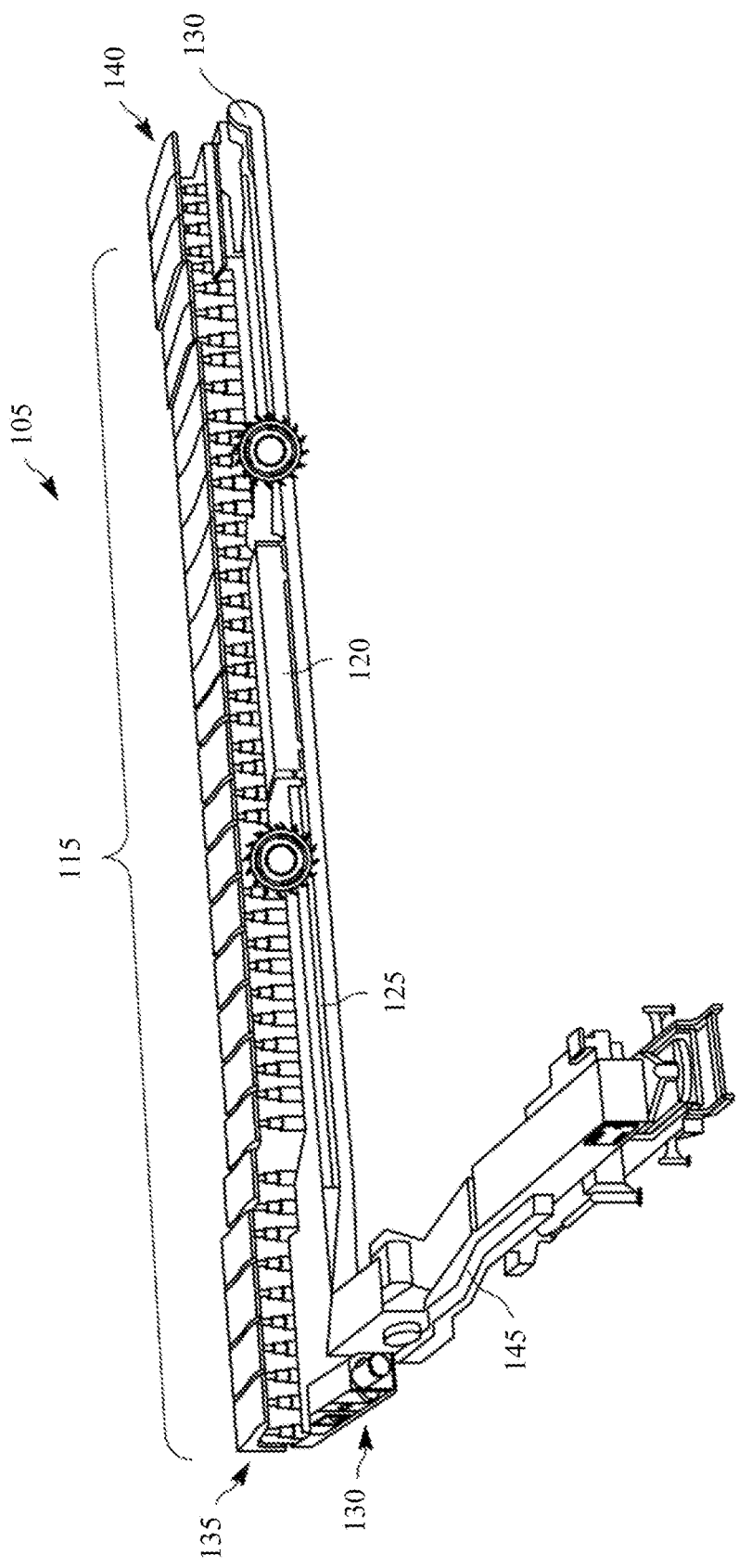
FIGS. 2A-2B illustrate a longwall mining system of the extraction system of FIG. 1 according to some embodiments.
Figure 2B:
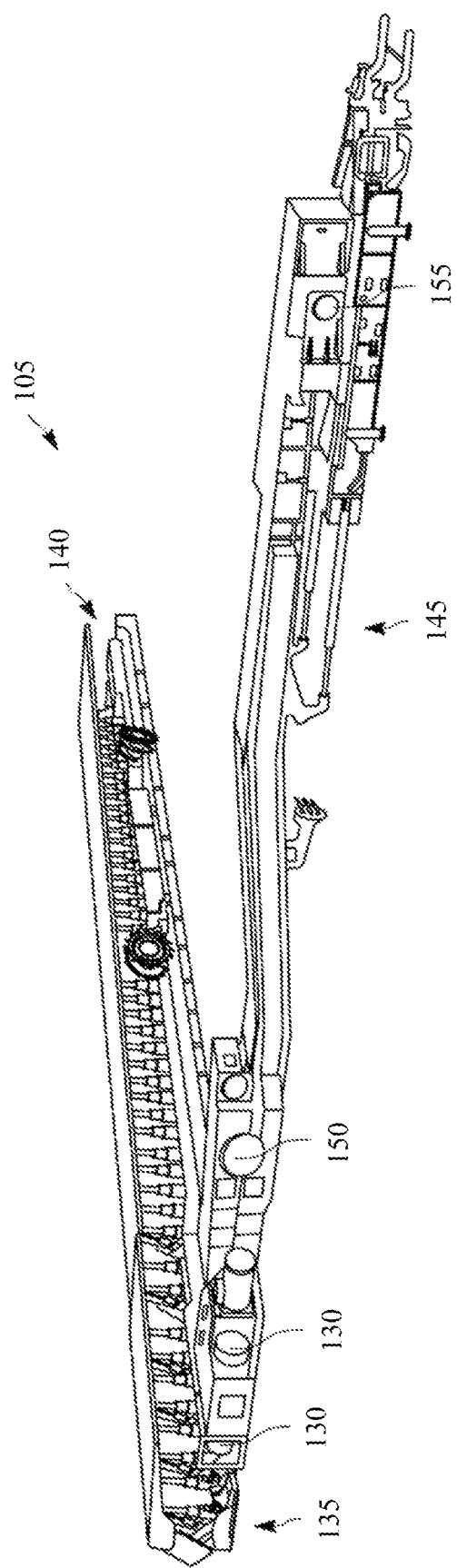

As illustrated in FIGS. 2A and 2B, the longwall mining system 105 includes roof supports 115, a shearer 120, and an armored face conveyor ("AFC") 125. The longwall mining system 105 is generally positioned parallel to a material face 126 (see FIG. 3). The roof supports 115 are interconnected parallel to the material face 126 (see FIG. 3) by electrical and hydraulic connections. Further, the roof supports 115 shield the shearer 120 from overlying geological strata 127 (see FIG. 3). The number of roof supports 115 used in the longwall mining system 105 depends on the width of the material face 126 being mined since the roof supports 115 are intended to protect the full width of the material face 126 from the geological strata 127. In some embodiments, the roof supports may each have an associated number (e.g., 1 through N total roof supports) and the roof supports may be used to identify a particular lateral position along the material face 126 (e.g., roof support N/2 may be at the approximate halfway point along the material face 126).

The shearer 120 is propagated along the line of the material face 126 by the AFC 125, which includes a dedicated track for the shearer 120 running parallel to the material face 126. The shearer track is positioned between the material face 126 itself and the roof supports 115. As the shearer 120 travels the width of the material face 126, removing a layer of material, the roof supports 115 automatically advance to support the roof of the newly exposed section of the geological strata 127.

Figure 3:
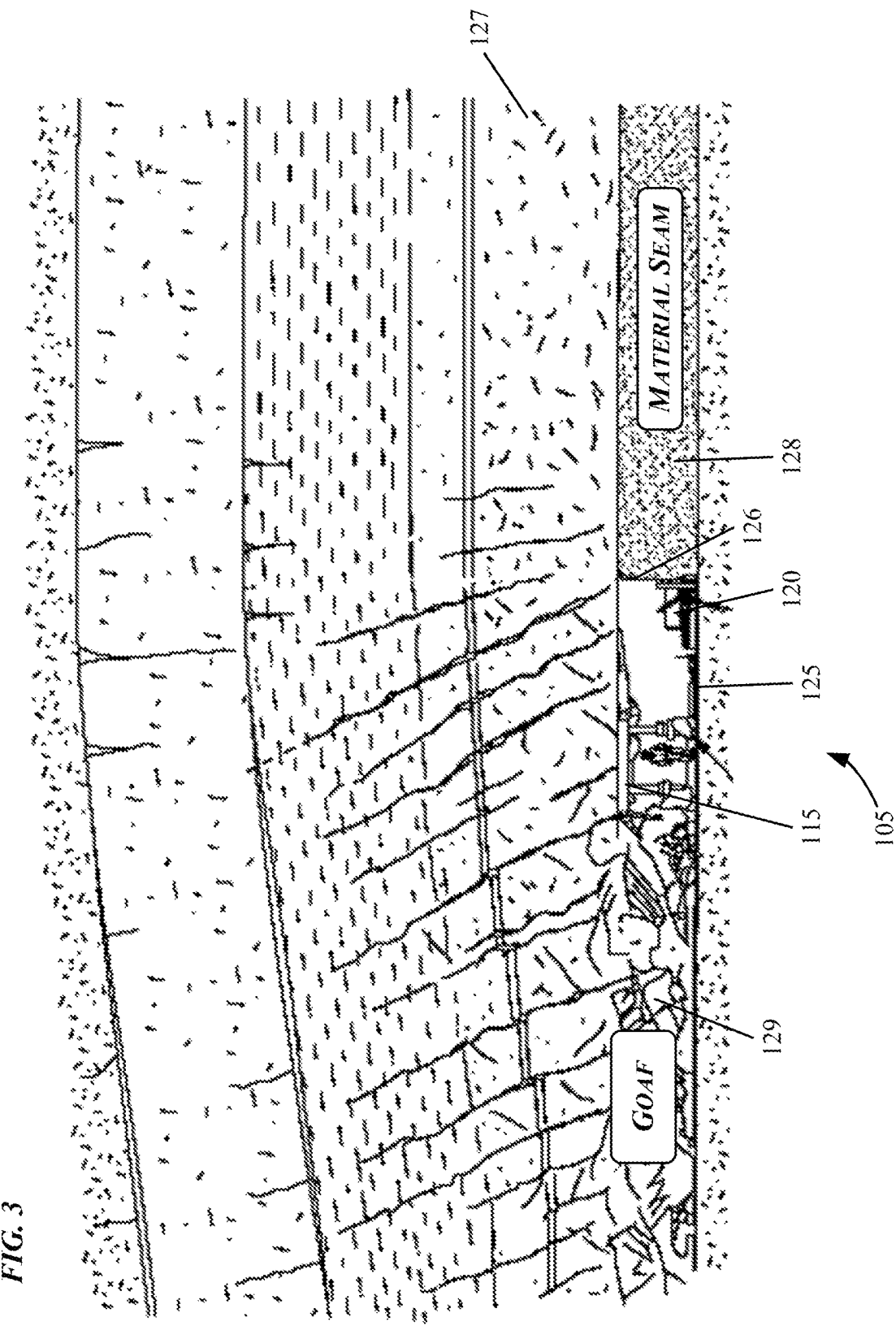
FIG. 3 illustrates collapsing of a geological strata as material is removed from a material seam according to some embodiments.

FIG. 3 illustrates the longwall mining system 105 advancing through a material seam 128 as the shearer 120 removes material from the material face 126. The material face 126 illustrated in FIG. 3 extends perpendicular from the plane of the figure. As the longwall mining system 105 advances through the material seam 128 (to the right in FIG. 3), the geological strata 127 is allowed to collapse behind the longwall mining system 105, forming a goaf 129. The longwall mining system 105 continues to advance forward and shear more material until the end of the material seam 128 is reached.

While the shearer 120 travels along the side of the material face 126, extracted material falls onto a conveyor included in the AFC 125, parallel to the shearer track. The material is transported away from the material face 126 by the conveyor. The AFC 125 is then advanced by the roof supports 115 toward the material face 126 by a distance equal to the depth of the material layer previously removed by the shearer 120. The advancement of the AFC 125 allows the excavated material from the next shearer pass to fall onto the conveyor, and also allows the shearer 120 to engage with the material face 126 and continue shearing material away. The conveyor and track of the AFC 125 are driven by AFC drives 130 located at a maingate 135 and a tailgate 140, which are at distal ends of the AFC 125, as seen in FIGS. 2A-2B. The AFC drives 130 allow the conveyor to continuously transport material toward the maingate 135 (left side of FIG. 2A), and allows the shearer 120 to be pulled along the track of the AFC 125 bi-directionally across the material face 126.

The longwall mining system 105 also includes a beam stage loader ("BSL") 145 arranged perpendicularly at the maingate end of the AFC 125. FIG. 2B illustrates a perspective view of the longwall mining system 105 and an expanded view of the BSL 145. When the extracted material hauled by the AFC 125 reaches the maingate 135, the material is routed through a 90° turn onto the BSL 145. In some instances, the BSL 145 interfaces with the AFC 125 at a non-right 90° angle. The BSL 145 then prepares and loads the material onto a maingate conveyor (not shown), which transports the material to the surface. The material is prepared to be loaded by a crusher 150, which breaks down the material to improve loading onto the maingate conveyor. Similar to the conveyor of the AFC 125, the conveyor of the BSL 145 is driven by a BSL drive 155.

Figure 4:
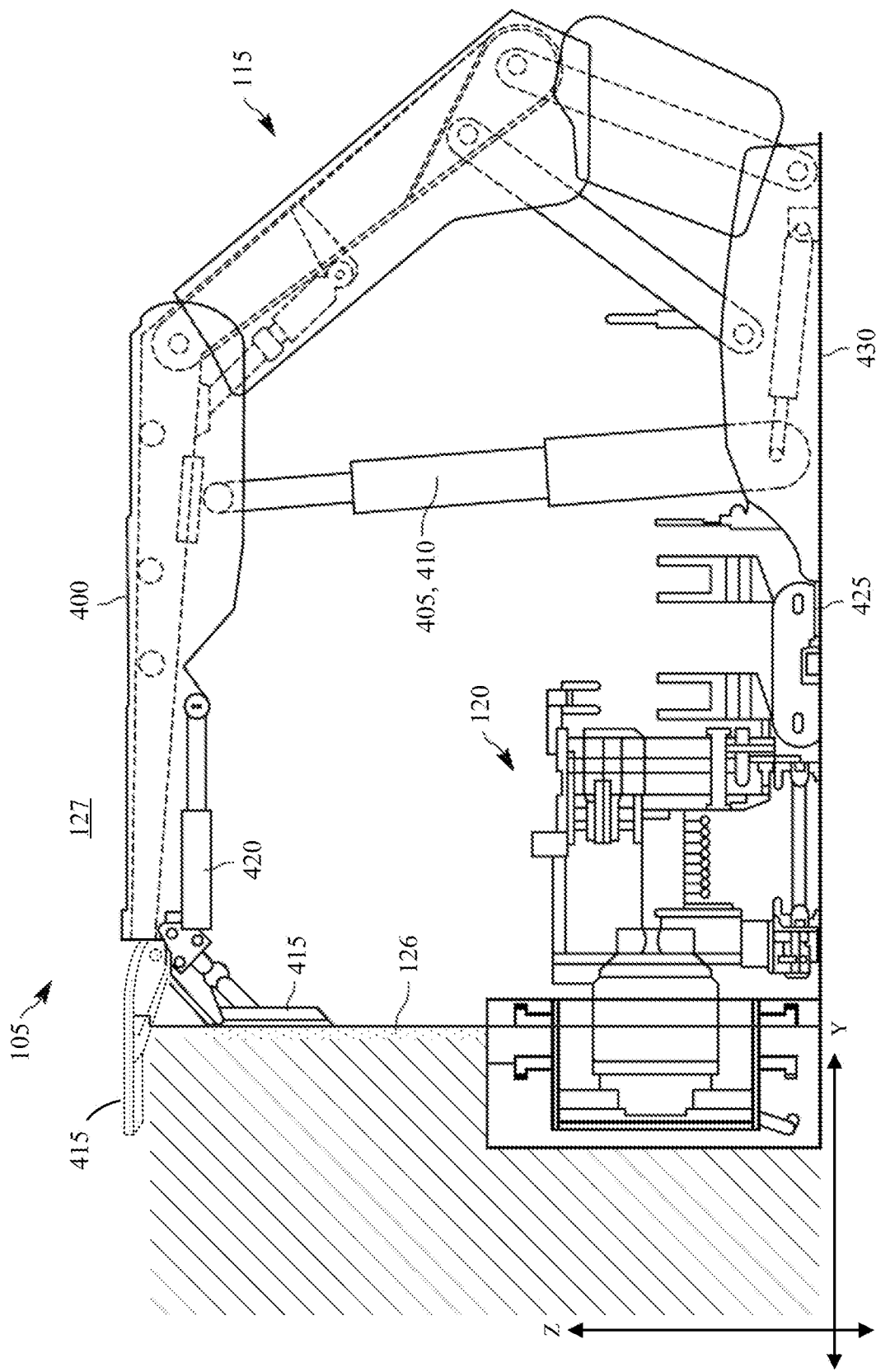
FIG. 4 illustrates a roof support of the longwall mining system of FIGS. 2A-2B according to some embodiments.

FIG. 4 illustrates the longwall mining system 105 as viewed along the line of the material face 126. The roof support 115 is shown shielding the shearer 120 from the overlying geological strata 127 by an overhanging canopy 400 of the roof support 115. The canopy 400 is vertically displaced (i.e., moved toward and away from the geological strata 127) by hydraulic legs 405, 410 (only one of which is shown in FIG. 4). The canopy 400 thereby exerts a range of upward forces on the geological strata 127 by applying different pressures to the hydraulic legs 405, 410. Mounted to the face end of the canopy 400 is a deflector or sprag 415, which is shown in a face-supporting position. However, the sprag 415 may also be fully extended, as represented in phantom in FIG. 4, by a sprag arm 420. An advance ram 425 attached to a base 430 allows the roof support 115 to be pulled toward the material face 126 as the layers of material are sheared away.

Figure 5A:
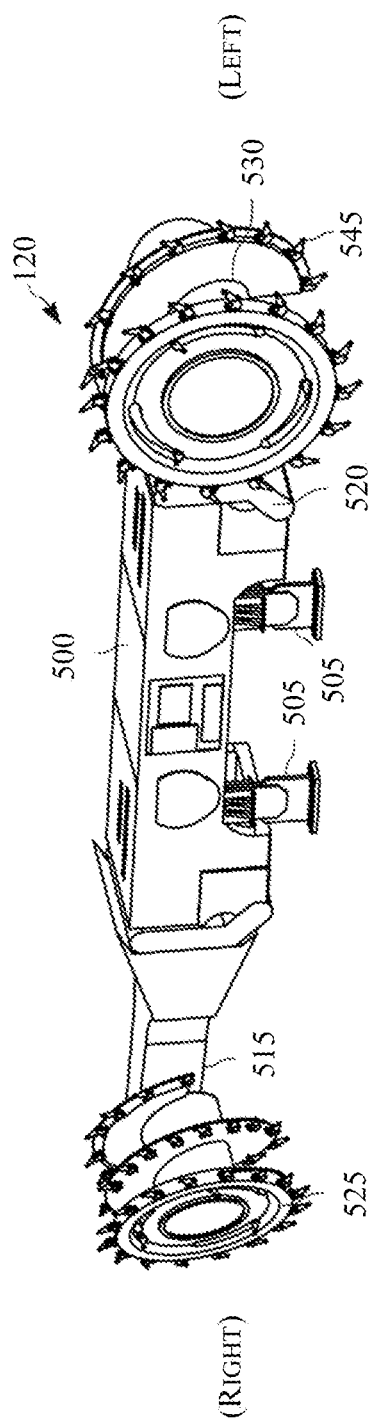
FIGS. 5A-5B illustrate a shearer of the longwall mining system of FIGS. 2A-2B according to some embodiments.
Figure 5B:
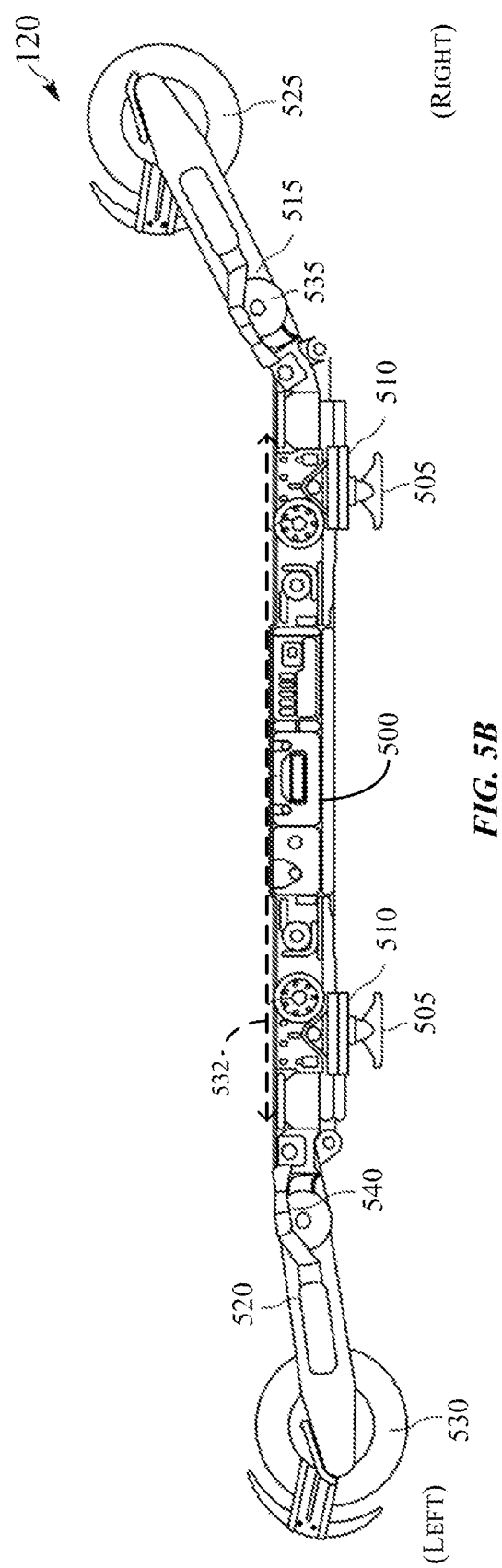

FIGS. 5A-5B illustrate the shearer 120. The shearer 120 has an elongated central control housing 500 that stores the operating controls for the shearer 120. Skid shoes 505 and trapping shoes 510 (see FIG. 5B) extend below the control housing 500. The skid shoes 505 support the shearer 120 on the face side of the AFC 125 (i.e., the side nearest to the material face 126) and the trapping shoes 510 support the shearer 120 on the goaf side of the AFC 125. Specifically, the trapping shoes 510 and haulage sprockets engage a rack bar of the AFC 125 to allow the shearer 120 to be propelled along the AFC 125 and the material face 126. Extending laterally from the control housing 500 are right and left ranging arms 515 and 520, respectively, such that the central control housing 500 is located between the right and left ranging arms 515 and 520. The right and left ranging arms 515 and 520 are raised and lowered by hydraulic cylinders attached to the ranging arms 515, 520 and the control housing 500. The hydraulic cylinders are part of a right arm hydraulic system configured to articulate the right ranging arm 515 and a left arm hydraulic system configured to articulate the left ranging arm 520.

On the distal end of the right ranging arm 515 (with respect to the control housing 500) is a right cutter drum 525, and on the distal end of the left ranging arm 520 is a left cutter drum 530. Each of the cutter drums 525, 530 has a plurality of mining bits 545 (for example, cutting picks) that abrade the material face 126 as the cutter drums 525, 530 are rotated, thereby cutting away the material. The mining bits 545 are also accompanied by spray nozzles that spray fluid during the mining process in order to disperse noxious and/or combustible gases that develop at the excavation site, suppress dust, and enhance cooling. Each cutter drum 525, 530 is driven by an electric motor 535, 540 (for example, a right cutter motor 535 and a left cutter motor 540) via the gear train within the ranging arms 515, 520. The right and left arm hydraulic systems are configured to vertically move the right ranging arm 515 and the left ranging arm 520, respectively, which changes the vertical position of the right cutter drum 525 and the left cutter drum 530, respectively.

The vertical positions of the cutter drums 525, 530 are a function of the angle of the ranging arms 515, 520 with respect to the control housing 500. Varying the angle of the ranging arms 515, 520 with respect to the control housing 500 increases or decreases the vertical position of the cutter drums 525, 530 accordingly. For example, when the left ranging arm 520 is raised to 20° from the horizontal (i.e., 20° from a longitudinal axis 532 of the shearer 120), the left cutter drum 530 may experience a positive change of vertical position of, for example, 0.5 m, while when the left ranging arm 520 is lowered to −20° from the horizontal, the left cutter drum 530 may experience a negative change of vertical position of, for example, −0.5 m. Therefore, the vertical position of the cutter drums 525, 530 may be measured and controlled based on the angle of the ranging arms 515, 520 with respect to the horizontal.

Figure 6A:
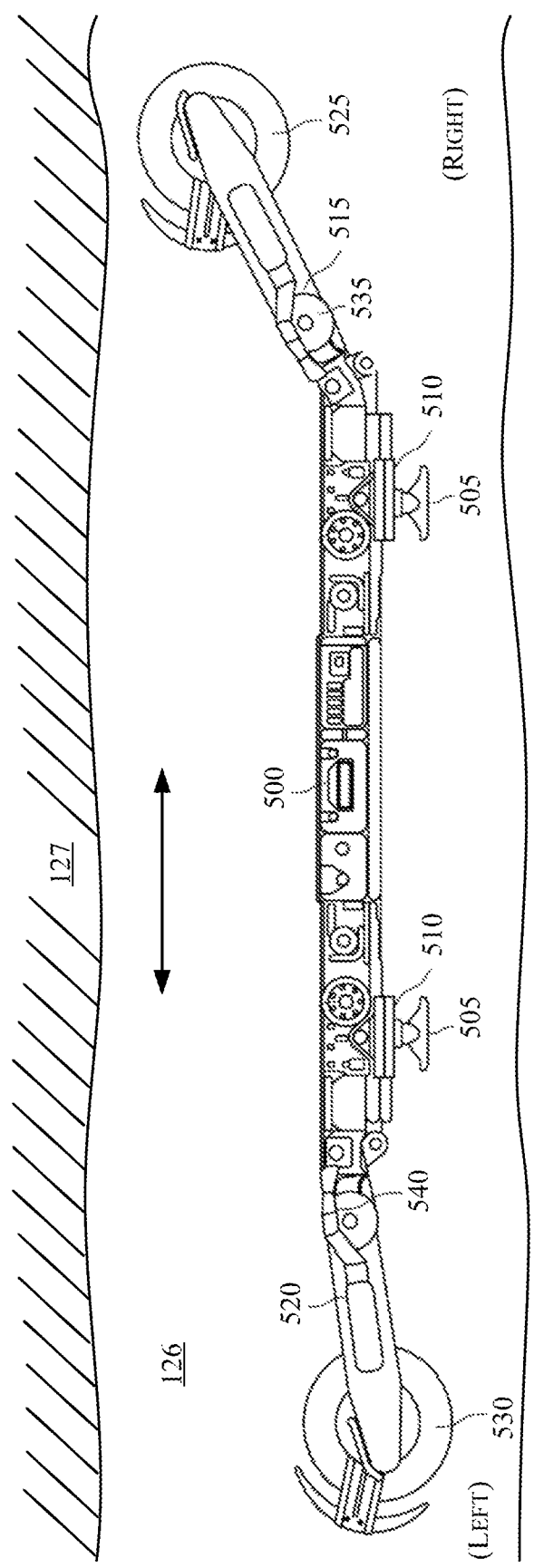
FIGS. 6A-6B illustrate the shearer of FIGS. 5A-5B passing through a material seam according to some embodiments.
Figure 6B:
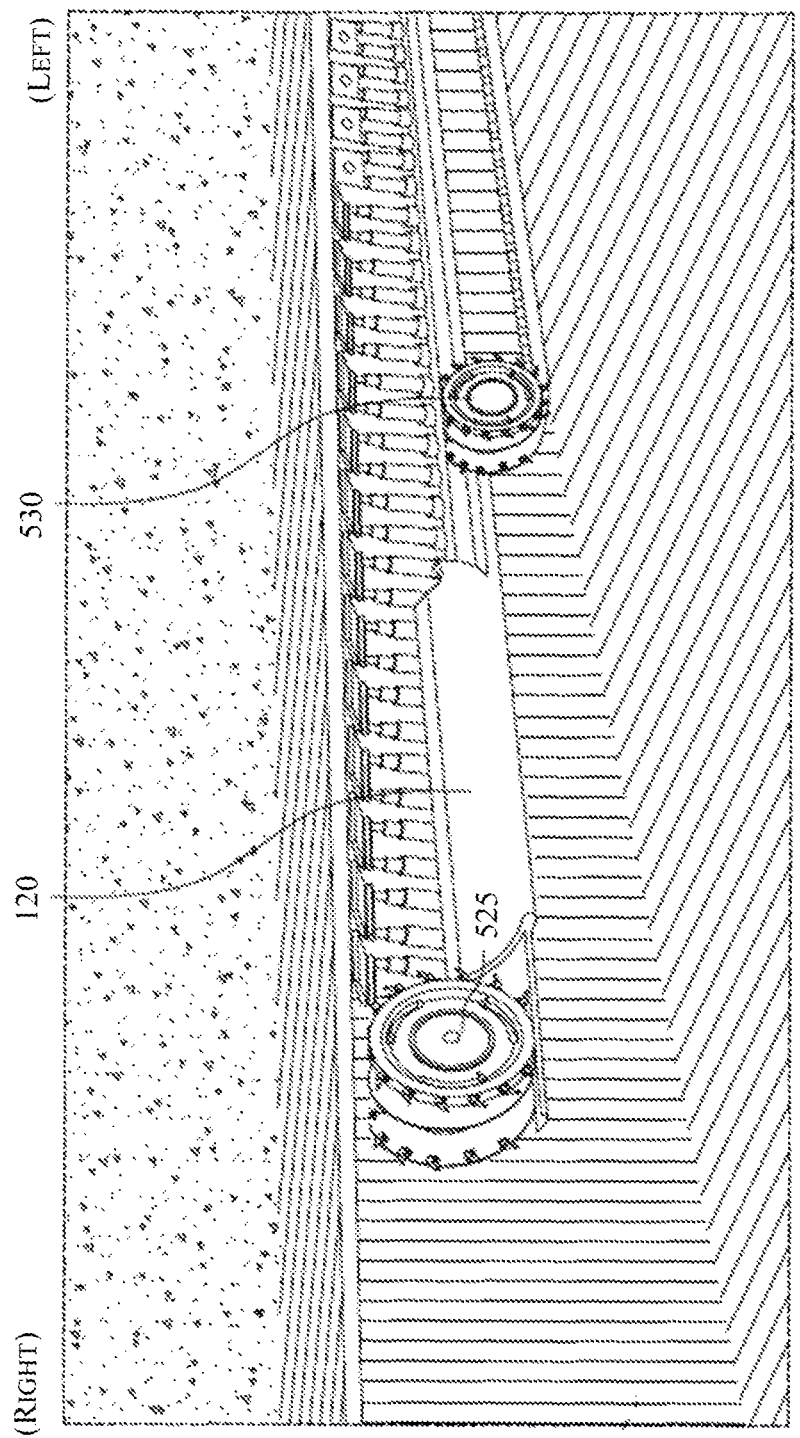

The shearer 120 is displaced laterally along the material face 126 in a bi-directional manner, though it is not necessary that the shearer 120 cut material bi-directionally. For example, in some mining operations, the shearer 120 is capable of being pulled bi-directionally along the material face 126, but only shears material when traveling in one direction. For example, the shearer 120 may be operated to cut material over the course of a first, forward pass over the width of the material face 126, but not cut material on its returning pass. Alternatively, the shearer 120 can be configured to cut material during both the forward and return passes, thereby performing a bi-directional cutting operation. FIGS. 6A-6B illustrate the shearer 120 as it passes over the material face 126 from a face-end view. As shown in FIGS. 6A-6B, the left cutter drum 530 and the right cutter drum 525 are staggered to increase the area of the material face 126 being cut in each pass of the shearer 120. In particular, as the shearer 120 is displaced horizontally along the AFC 125, the left cutter drum 530 is shown shearing material away from the lower half (for example, a lower portion) of the material face 126 and may be referred to as a floor cutter herein, while the right cutter drum 525 is shown shearing material away from the upper half (for example, an upper portion) of the material face 126. The right cutter drum 525 may be referred to as a roof cutter herein. It should be understood that in some embodiments, the left cutter drum 530 cuts the upper portion of the material face 126 while the right cutter drum 525 cuts the lower portion of the material face 126.

Figure 7:
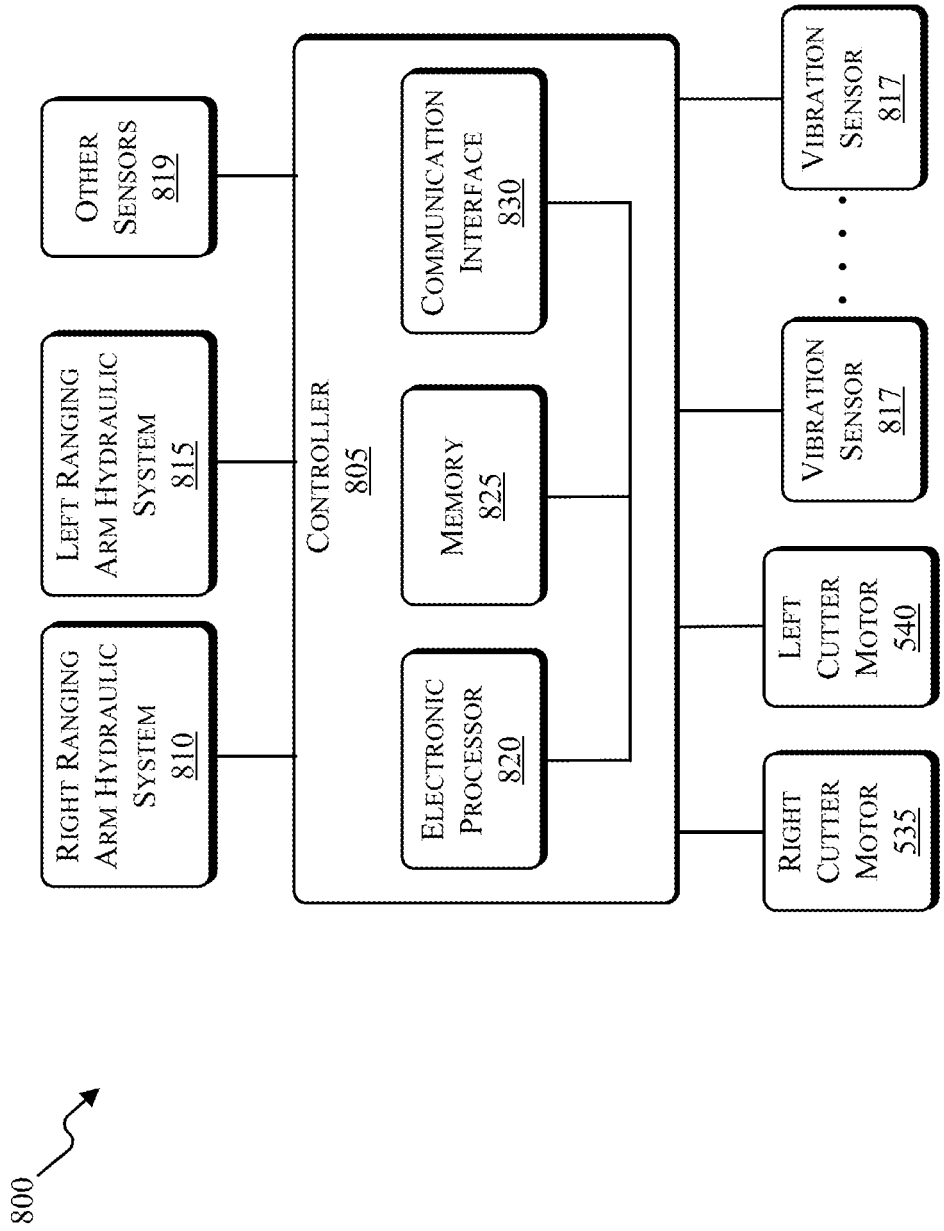
FIG. 7 illustrates an underground longwall control system according to some embodiments.

FIG. 7 illustrates an underground longwall control system 800 for controlling and monitoring the longwall mining system 105 according to some embodiments. As illustrated in FIG. 7, the system 800 includes an electronic controller 805, a right ranging arm hydraulic system 810, a left ranging arm hydraulic system 815, a plurality of vibration sensors 817 (referred to herein collectively as "the vibration sensors 817" and individually as "the vibration sensor 817"), the right cutter motor 535, the left cutter motor 540, and other sensors 819 associated with the shearer 120. In some embodiments, the system 800 includes fewer, additional, or different components than those illustrated in FIG. 7 in various configurations and may perform additional functionality than the functionality described herein. For example, in some embodiments the system 800 includes other components associated with the shearer 120, such as one or more actuators, motors, pumps, and the like. In some embodiments, the system 800 is located on the shearer 120. In some embodiments, the system 800 includes components not located on the shearer 120. For example, in some embodiments, the controller 805 or a portion thereof is located on another computer system in communication with the shearer 120. For example, at least some of the processing steps and memory storage functions of the electronic processor 820 and the memory 825 may be performed by an electronic processor and memory on the shearer 120 and at least some of the processing steps and memory storage functions of the electronic processor 820 and the memory 825 may be performed by an electronic processor and memory in communication with the shearer 120.

In the example illustrated in FIG. 7, the controller 805 includes an electronic processor 820 (for example, a microprocessor, an application specific integrated circuit, or another suitable electronic device), a memory 825 (for example, one or more non-transitory computer-readable storage mediums), and a communication interface 830. The electronic processor 820, the memory 825, and the communication interface 830 communicate over one or more data connections or buses, or a combination thereof. The controller 805 illustrated in FIG. 7 represents one example, and, in some embodiments, the controller 805 includes fewer, additional, or different components in different configurations than illustrated in FIG. 7. Also, in some embodiments, the controller 805 performs functionality in addition to the functionality described herein.

The electronic processor 820 is configured to retrieve instructions from the memory 825 and execute instructions to perform a set of functions, including the methods described herein. For example, in some embodiments, the electronic processor 820 executes instructions for controlling a cutting parameter of the shearer 120, detecting an impact event, providing an impact event record of the shearer 120, maintaining a cutter drum 525, 530 within a target material seam, or a combination thereof. The memory 825 may include combinations of different types of memory, such as read-only memory ("ROM"), random access memory ("RAM"), or another non-transitory computer readable medium. As noted above, the memory 825 stores instructions executed by the electronic processor 820. The memory 825 may also store data, such as vibration data collected by the vibration sensors 817, additional data collected by the other sensors 819, and the like. The memory 825 may also store firmware, one or more applications, program data, filters, rules, one or more program modules, and other executable instructions or data.

The communication interface 830 allows the controller 805 to communicate with devices external to the controller 805 (for example, receive input from and provide output to devices external to the controller 805 directly or indirectly). In one example, the controller 805 communicates with the right ranging arm hydraulic system 810, the left ranging arm hydraulic system 815, one or more of the vibration sensors 817, the right cutter motor 535, the left cutter motor 540, the other sensors 819, or a combination thereof through the communication interface 830. In some embodiments, the communication interface 830 includes a port for receiving a wired connection to the right ranging arm hydraulic system 810, the left ranging arm hydraulic system 815, one or more of the vibration sensors 817, the right cutter motor 535, the left cutter motor 540, the other sensors 819, or a combination thereof. Alternatively or in addition, the communication interface 830 includes a transceiver for establishing a wireless connection to the right ranging arm hydraulic system 810, the left ranging arm hydraulic system 815, one or more of the vibration sensors 600, the right cutter motor 535, the left cutter motor 540, the other sensors 819, or a combination thereof. Alternatively or in addition, the communication interface 830 communicates with a communication bus (for example, a controller area network ("CAN")) to indirectly communicate with, for example, the right ranging arm hydraulic system 810, the left ranging arm hydraulic system 815, one or more of the vibration sensors 817, the right cutter motor 535, the left cutter motor 540, the other sensors 819, or a combination thereof.

The communication interface 830 also allows the controller 805 to communicate with the mine monitoring system 110. For example, the communication interface 830 further includes a port for receiving a wired connection (a wired interface) or a transceiver for establishing a wireless connection (a wireless interface) for communicating with the mine monitoring system 110 either directly or indirectly (e.g., via one of the aforementioned communication networks).

The vibration sensors 817 provide information regarding vibration or impacts experienced by the shearer 120 or a component thereof, such as the cutter drums 525, 530 or the ranging arms 515, 520. Accordingly, the vibration sensors 817 collect vibration data associated with the shearer 120 or a component thereof. For example, each vibration sensor 817 may be an accelerometer. In some embodiments, the vibration data is associated with the shearer 120 as a whole. Alternatively or in addition, in other embodiments, the vibration data is associated with one or more components of the shearer 120, such as the cutter drums 525, 530, the ranging arms 515, 520, and the like. In such embodiments, the system 800 may include two or more vibration sensors 817, where each vibration sensor 817 is associated with a particular component, system, or portion of the shearer 120. For example, a first vibration sensor 817 may be associated with the right cutter drum 525 and configured to collect vibration data associated with the right cutter drum 525, while a second vibration sensor 817 may be associated with the left cutter drum 530 and configured to collect vibration data associated with the left cutter drum 530. Accordingly, in some embodiments, the vibration data may include multiple sets or collections of vibration data (i.e., a first set of vibration data, a second set of vibration data, and the like), where each set of vibration data may be associated with a particular component, system, or portion of the shearer 120.

Figure 8:
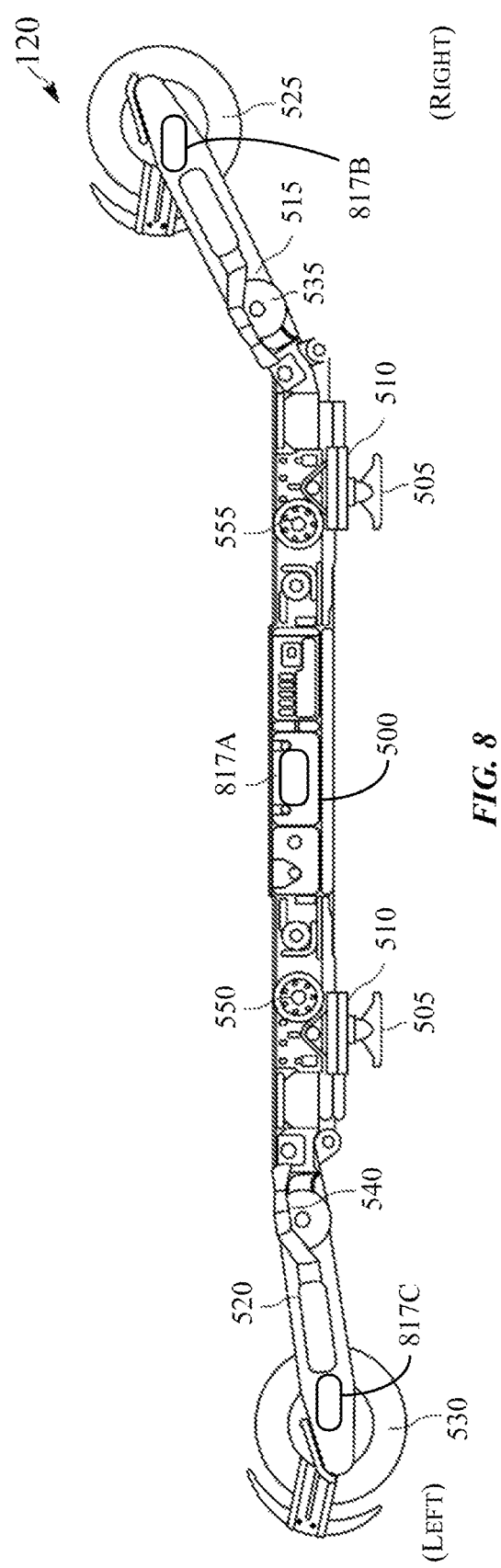
FIG. 8 illustrates approximate locations for one or more sensors of the shearer of FIGS. 5A-5B according to some embodiments.

As illustrated in FIG. 8, the vibration sensors 817 are mounted on the shearer 120. In the exampled illustrated in FIG. 8, three vibration sensors 817 (shown as 817A, 817B, and 817C) are mounted on the shearer 120. As seen in FIG. 8, a first vibration sensor 817A is mounted in the control housing 500 of the shearer 120. The first vibration sensor 817A detects vibration data associated with or experienced by the shearer 120 as a whole. In some embodiments, multiple vibration sensors 817 are mounted within the control housing 500. In such embodiments, each vibration sensor 817 may be associated with a different component, system, or portion of the shearer 120, such as the cutter drums 525, 530, the ranging arms 515, 520, and the like. Additionally, as seen in FIG. 8, a second vibration sensor 817B and a third vibration sensor 817C are mounted to the right ranging arm 515 and the left ranging arm 520, respectively. The second vibration sensor 817B detects vibration data associated with or experienced by the right ranging arm 515, the right cutter drum 525, or a combination thereof. The third vibration sensor 817C detects vibration data associated with or experienced by the left ranging arm 520, the left cutter drum 530, or a combination thereof.

Returning to FIG. 7, the system 800 also includes the other sensors 819. The other sensors 819 may include, for example, a left ranging arm angle sensor, a right ranging arm angle sensor, a left haulage gear sensor, a right haulage gear sensor, a pitch angle and roll angle sensor, and the like. The other sensors 819 collect additional data associated with the shearer 120. The additional data associated with the shearer 120 may include, for example, a time of day, a geographical location, an operator characteristic or identification, an operational state, a cutting parameter, a roof support position of the shearer, a position within a cutting sequence, and the like. The other sensors 819 may transmit the additional data to the controller 805 for storage in the memory 825, for data processing or analysis, and the like.

The system 800 also includes the right ranging arm hydraulic system 810, the left ranging arm hydraulic system 815, the right cutter motor 535, and the left cutter motor 540. The right ranging arm hydraulic system 810 and the left ranging arm hydraulic system 815 are configured to vertically move the right ranging arm 515 and the left ranging arm 520, respectively, which changes the vertical position (i.e., a cutting height) of the right cutter drum 525 and the left cutter drum 530, respectively. The right cutter motor 535 and the left cutter motor 540 are configured to drive the cutter drums 525, 530 via a gear train within the ranging arms 515, 520. The controller 805 is configured to control the right ranging arm hydraulic system 810, the left ranging arm hydraulic system 815, the right cutter motor 535, and the left cutter motor 540.

Figure 9:
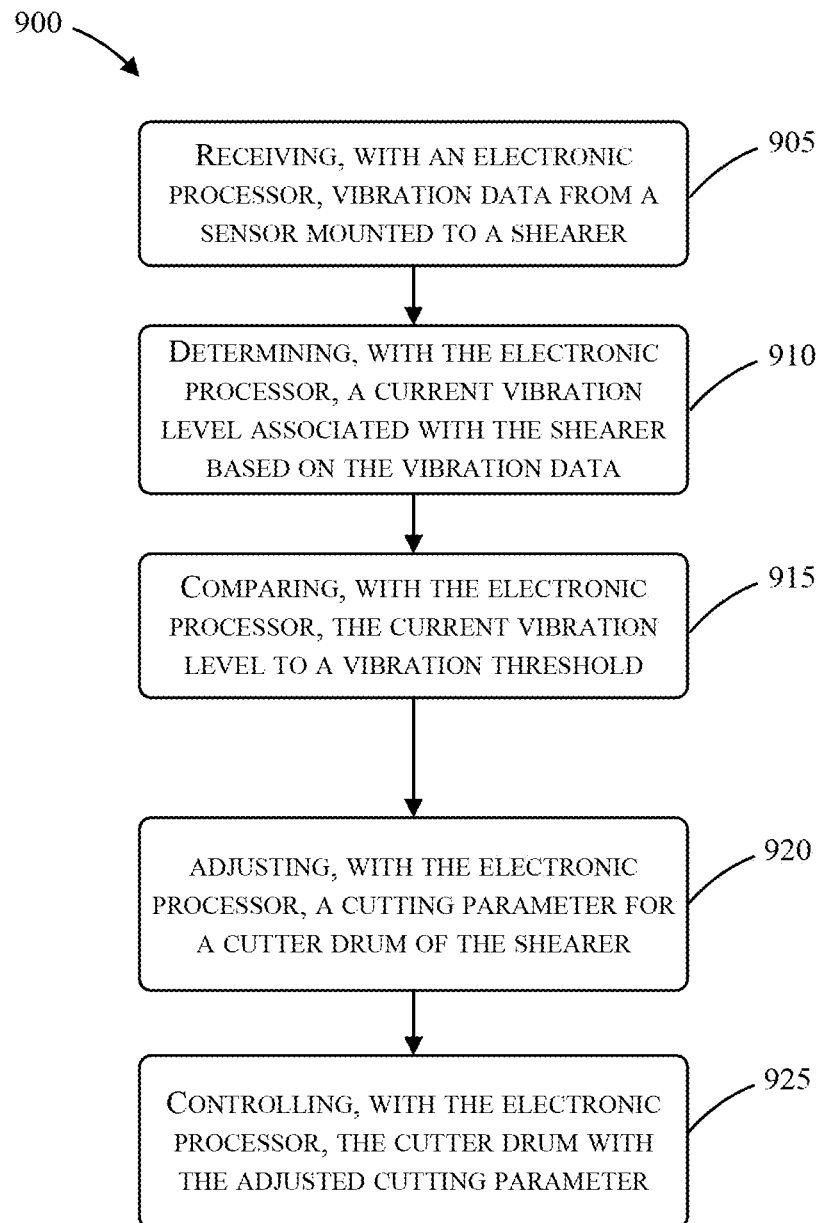
FIG. 9 is a flowchart of a method for controlling a longwall mining system using the underground longwall control system of FIG. 7 according to some embodiments.

As noted above, in some embodiments, the electronic processor 820 of the controller 805 executes instructions for controlling the longwall mining system 105. For example, FIG. 9 is a flowchart of a method 900 for controlling the longwall mining system 105 by controlling a cutting parameter of the shearer 120 according to some embodiments. As illustrated in FIG. 9, the method 900 includes receiving, with the electronic processor 820, vibration data from a sensor mounted to the shearer 120 (at block 905). As described above, the electronic processor 820 may receive the vibration data from one or more of the vibration sensors 817. In some embodiments, the electronic processor 820 may receive multiple sets or collections of vibration data from more than one of the vibration sensors 817. The vibration data may include a single vibration reading collected by the vibration sensor 817. However, in some embodiments, the vibration data may include a collection of vibration readings collected by the vibration sensor 817. A collection of vibration readings may refer to a plurality of vibration readings collected by one or more of the vibration sensors 817.

The electronic processor 820 may continuously receive the vibration data in real time (or near real time) during operation of the shearer 120. Alternatively or in addition, in some embodiments, the electronic processor 820 receives the vibration data periodically. For example, the electronic processor 820 may receive the vibration data based on a schedule or predetermined time period, such as every five minutes or thirty seconds. Alternatively or in addition, the electronic processor may receive the vibration data based on an operational state or status of the shearer 120. For example, the electronic processor 820 may receive the vibration data after each pass along the material face 126, after advancing a predetermined distance along the material face (for example, every two feet), after a change in operational parameters (for example, when the operator changes a cutting speed), and the like.

After receiving the vibration data, the electronic processor 820 determines a current vibration level associated with the shearer 120 based on the vibration data (at block 910). The current vibration level represents an amount of vibration currently being experienced by the shearer 120, one or more components of the shearer 120 (for example, the right ranging arm 515, the left ranging arm 520, the right cutter drum 525, the left cutter drum 530, or the like), or a combination thereof. In some embodiments, the electronic processor 820 determines the current vibration level based on a single vibration reading of the vibration data. For example, the vibration data may include an analog signal from the vibration sensor 817 that is proportional to the vibration sensed from an instantaneous vibration reading of the vibration sensor 817. However, in other embodiments, the electronic processor 820 determines the current vibration level based on a collection of vibration readings of the vibration data. In such embodiments, the electronic processor 820 may determine the current vibration level by determining an average, a median, or a mean of the collection of vibration readings of the vibration data. In other words, the electronic processor 820 may determine the current vibration level to be the average, the median, or the mean of the collection of vibration readings.

As seen in FIG. 9, the electronic processor 820 compares the current vibration level to a vibration threshold (at block 915). In some embodiments, the electronic processor 820 sets or defines the vibration threshold based on a characteristic of a target material seam to be mined. For example, the electronic processor 820 may set the vibration threshold based on a vibration level of the target material seam. The vibration level of the target material seam may represent a known or expected vibration level associated with a material of the target material seam. Alternatively or in addition, the electronic processor 820 may set or define the vibration threshold based on a characteristic of the shearer 120. For example, the electronic processor 820 may set the vibration threshold based on a vibration limit for the shearer 120, where vibration levels exceeding the vibration limit for the shearer 120 may result in damage to the shearer 120 or a component thereof. The vibration limit for the shearer 120 may be a vibration limit for the shearer 120 as a whole or for a component thereof, such as a ranging arm 515, 520 or cutter drum 525, 530. Alternatively or in addition, the electronic processor 820 may set or define the vibration threshold based on an operating characteristic of the shearer 120. For example, during operation of the shearer 120, the electronic processor 820 may adjust the vibration threshold based on a current cutting speed of the shearer 120, a current height of a ranging arm 515, 520, or a position along the material seam. As another example, the electronic processor 820 may adjust the vibration threshold based on an age of the shearer 120 (for example, lower the vibration threshold when the shearer 120 is older or increase the vibration threshold when the shearer 120 is newer). Accordingly, in some embodiments, the electronic processor 820 may set or define the vibration threshold based on a normal or expected vibration level for a specific shearer installation.

The electronic processor 820 compares the current vibration level to the vibration threshold in order to determine whether the current vibration level exceeds the vibration threshold. As used herein, "exceeds" or "exceeding" means greater than or means greater than or equal to and "does not exceed" means less than or means less than or equal to. When the current vibration level exceeds the vibration threshold, the electronic processor 820 adjusts a cutting parameter of the shearer 120 (at block 920) and controls the shearer 120 with the adjusted cutting parameter (at block 925). The cutting parameter for the shearer 120 may include, for example, a cutting speed, a cutting height, another cutting parameter, or a combination thereof for one or more of the cutter drums 525, 530. In some embodiments, in blocks 920 and 925, respectively, the electronic processor 820 adjusts one or more cutting parameters of the shearer 120 (for example, a first cutting parameter, a second cutting parameter, a third cutting parameter, and the like) and controls the shearer 120 with the adjusted cutting parameters. For example, the electronic processor 820 may adjust a first cutting parameter for the left cutter drum 530 and a second cutting parameter for the right cutter drum 525. As another example, the electronic processor 820 may adjust a first cutting parameter, such as a cutting speed, for the left cutter drum 530 and a second cutting parameter, such as a cutting height, for the left cutter drum 530. In some embodiments, the electronic processor 820 continues to adjust the one or more cutting parameters until the current vibration level does not exceed the vibration threshold. In other words, the electronic processor 820 may continuously monitor the current vibration level against the vibration threshold and continuously adjust one or more of the cutting parameters until the current vibration level no longer exceeds the vibration threshold.

In some embodiments, the electronic processor 820 adjusts the cutting parameter of the shearer 120 by adjusting a cutting speed of one or more of the cutter drums 525, 530. The electronic processor 820 may adjust a cutting speed of one or more of the cutter drums 525, 530 by reducing a cutting speed or increasing a cutting speed. In such embodiments, the electronic processor 820 may transmit a control signal to the right cutter motor 535, the left cutter motor 540, or a combination thereof. For example, when the electronic processor 820 determines that the current vibration level experienced by the right cutter drum 525 exceeds the vibration threshold, the electronic processor 820 may transmit a control signal for adjusting a cutting speed to the right cutter motor 535. In response to receiving the control signal, the right cutter motor 535 may drive the right cutter drum 525 at an adjusted cutting speed, such as a reduced cutting speed.

Alternatively or in addition, in some embodiments, the electronic processor 820 adjusts the cutting parameter of the shearer 120 by adjusting a cutting height of one or more of the cutter drums 525, 530. The electronic processor 820 may adjust the cutting height of one or more of the cutter drums 525, 530 by reducing a cutting height or increasing a cutting height. In such embodiments, the electronic processor 820 may transmit a control signal to the right ranging arm hydraulic system 810, the left ranging arm hydraulic system 815, or a combination thereof. For example, when the electronic processor 820 determines that the current vibration level experienced by the left cutter drum 530 exceeds the vibration threshold, the electronic processor 820 may transmit a control signal for adjusting a height (or position) to the left ranging arm hydraulic system 815. In response to receiving the control signal, the left ranging arm hydraulic system 815 may control the left ranging arm 520 to adjust the cutting height of the left cutter drum 530 such that the left cutter drum 530 cuts at, for example, a reduced cutting height.

In some embodiments, as previously described, a vibration sensor, such as vibration sensor 817A, is provided to sense vibration for the shearer 120 as a whole, rather than to sense vibration particular to a left or right side of the shearer 120. In such embodiments, in block 920, an adjustment is made to a cutting parameter for both the right and left cutter drums 525, 530. For example, the speed of both the right and left cutter drums 525, 530 may be reduced; the floor cutter drum (e.g., drum 525) may be raised and the ceiling cutter drum (e.g., drum 530) may be lowered; or a combination thereof. In some embodiments, as previously described, vibration sensors, such as vibration sensors 817B and 817C, are provided to respectively sense vibration particular to the left and right side of the shearer 120. In such embodiments, in block 920, an adjustment is made to a cutting parameter for each side of the shearer 120 on which the excessive vibration is sensed. For example, in steps 905-915, when the electronic processor 820 determines that vibration sensed by vibration sensor 817B exceeds the vibration threshold, the cutting parameter is adjusted in block 920 for the right cutter drum 525 (e.g., the speed, height, or both the speed and height of the right cutter drum 525 are adjusted). Similarly, in steps 905-915, when the electronic processor 820 determines that vibration sensed by vibration sensor 817C exceeds the vibration threshold, the cutting parameter is adjusted in block 920 for the left cutter drum 530 (e.g., the speed, height, or both the speed and height of the right cutter drum 530 are adjusted). Finally, in steps 905-915, when the electronic processor 820 determines that vibration sensed by vibration sensor 817B and the vibration sensor 817C both exceed the vibration threshold, the cutting parameter is adjusted in block 920 for both the right and left cutter drums 525, 530.

In some embodiments, after controlling the cutter drum 525,530 with the adjusted cutting parameter in step 925, the electronic processor 810 continues to monitor vibration of the shearer based on vibration data from the one or more vibration sensors 817 and continues to make further adjustments to the cutting parameter. For example, when further vibration data is received, the electronic processor 810 determines a current vibration level based on the new vibration data and compares the current vibration level to a vibration threshold. When the current vibration level exceeds the vibration threshold (again), the electronic processor 810 further adjusts the cutting parameter (e.g., further reduces speed, further reduces height, further increases speed, or further increases height of one or both of the cutter drums 525,530). Additionally, in some embodiments, when the current vibration level no longer exceeds the vibration threshold, or when the current vibration level drops below a second vibration threshold that is lower than the vibration threshold previously used in step 915, the electronic processor 810 is configured to adjust the cutting parameter to reverse, at least in part, the previous adjustment. For example, when the initial adjustment of the cutting parameter reduced the speed of the cutter drums 525, 530, the electronic processor 810 increases the speed of the cutter drum 525, 530 to reverse, at least in part, the previous adjustment. Similarly, when the initial adjustment of the cutting parameter reduced the height of one of the cutter drums 525, 530, the electronic processor 810 increases the height of the cutter drum 525, 530 to reverse, at least in part, the previous adjustment.

In some embodiments, the electronic processor 820 transmits a control instruction to an operator of the shearer 120. The operator may be using, for example, one or more computer devices making up the mine monitoring system 110 that is in communication with the longwall mining system 105, or may be using a computer device in the form of a local shearer-specific control panel in direct or indirect wired or wireless communication with the longwall mining system 105. Regardless, the computer device, also referred to as an operator remote device, includes a user interface with an output device (for example, one or more of a display screen, speaker, tactile feedback device), an input device (for example, one or more of a touchscreen, keyboard, mouse, dial, pushbuttons), or a combination therefore (e.g., a touch display). The electronic processor 820 may transmit the control instruction based on the comparison of the current vibration level and the vibration threshold. When the current vibration level does not exceed the vibration threshold, the electronic processor 820 may transmit a control instruction to the operator computer device instructing the operator not to adjust a cutting parameter in order to maintain the shearer cutting in seam. The control instruction may be displayed, audibly output, or otherwise output to the operator via the computer device. When the current vibration level exceeds the vibration threshold, the electronic processor 820 may transmit a control instruction instructing the operator to adjust a cutting parameter of the shearer 120 in order to return the shearer back to cutting in seam. For example, the control instruction may include an instruction to reduce a cutting speed, increase a cutting speed, reduce a cutting height, increase a cutting height, or a combination thereof for one or more of the cutter drums 525, 530.

Figure 10:
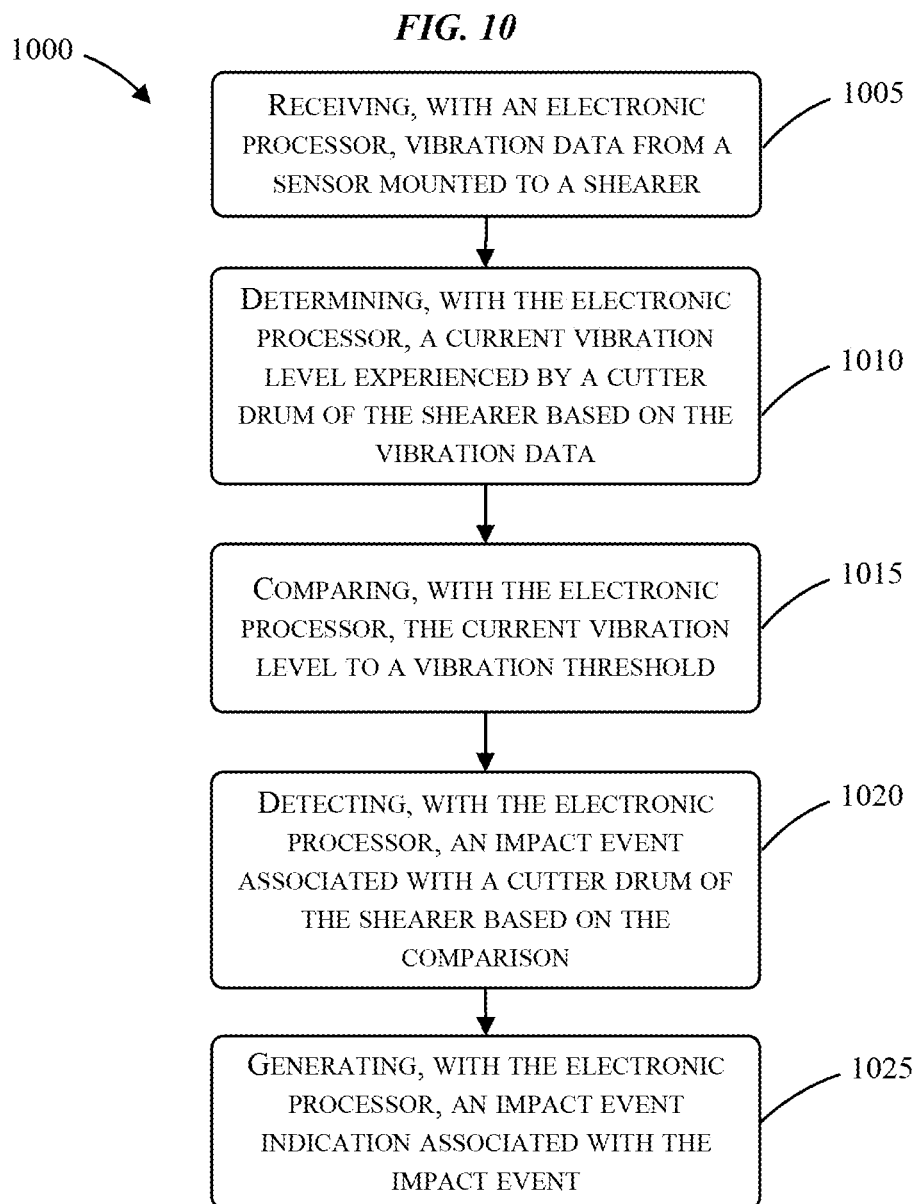
FIG. 10 is a flowchart of a method for monitoring a longwall mining system using the underground longwall control system of FIG. 7 according to some embodiments.

As noted above, the electronic processor 820 of the controller 805 may execute instructions for monitoring the longwall mining system 105. For example, FIG. 10 is a flowchart of a method 1000 for monitoring the longwall mining system 105 by detecting an impact event according to some embodiments. As seen in FIG. 10, the method 1000 includes receiving, with the electronic processor 820, vibration data from a sensor mounted to the shearer 120 (at block 1005), determining, with the electronic processor 820, a current vibration level associated with the shearer 120 based on the vibration data (at block 1010), and comparing, with the electronic processor 820, the current vibration level to a vibration threshold (at block 1015). With respect to method 1000, the electronic processor 820 may perform blocks 1005-1015 in a similar manner as described above with respect to blocks 905-915 of method 900 illustrated in FIG. 9.

As illustrated in FIG. 10, the method 1000 also includes detecting, with the electronic processor 820, an impact event associated with the shearer 120 based on the comparison (at block 1020). An impact event occurs when the shearer 120 (or a component thereof) experiences an abnormal load or vibration (i.e., an unusually high vibration level). The shearer 120 may experience an impact event as a result of misuse of the shearer 120. For example, the shearer 120 may experience an impact event when operated outside of recommended operating parameters, such as at a cutting speed above recommended cutting speeds for the shearer 120. Alternatively or in addition, the shearer 120 may experience an impact event as a result of difficult mining conditions, such as a hardness of a material to be mined. Accordingly, in some embodiments, when the current vibration threshold exceeds the vibration threshold, the electronic processor 820 detects an impact event associated with the shearer 120.

In response to detecting the impact event, the electronic processor 820 may generate an impact event indication associated with the impact event (at block 1025). In some embodiments, the electronic processor 820 stores the impact event indication in the memory 825 of the controller 805. Alternatively or in addition, the electronic processor 820 transmits the impact event indication to a device external to the shearer 120, where the impact event indication may be stored, displayed, or a combination thereof. In some embodiments, the electronic processor 820 generates and transmits a control instruction to an operator of the shearer 120 based on the impact event indication. The control instruction may include an instruction to, for example, adjust a cutting parameter of one or more of the cutter drums 525, 530, such as reducing a cutting speed, reducing a cutting height, or the like.

Such control instructions enable an operator and other mine personnel to be better informed regarding operation of the longwall mining system 105 and to take corrective action in response to such control instructions. Without such monitoring or notifications, an operator and other mine personnel may not be aware that the shearer 120 is encountering hard material or stone, or otherwise experiencing impacts that can reduce the lifetime of the mining equipment or reduce the effectiveness of the mining equipment. For example, it may be difficult for an operator to perceive or determine when vibration experienced by the longwall mining system 105 changes from typical vibration for which the shearer 120 is designed to experience to excessive vibration that could damage the shearer 120. Automated vibration sensing and impact event detection as described with respect to the method 1000, however, may improve the identification of impact events. Additionally, mine supervisors may be better informed to identify operators that are more likely to encounter such impact events and provide additional training to these operators to reduce wear on the longwall mining system 105. Further advantages and benefits are also provided by the method 1000 and not discussed herein.

Figure 11:
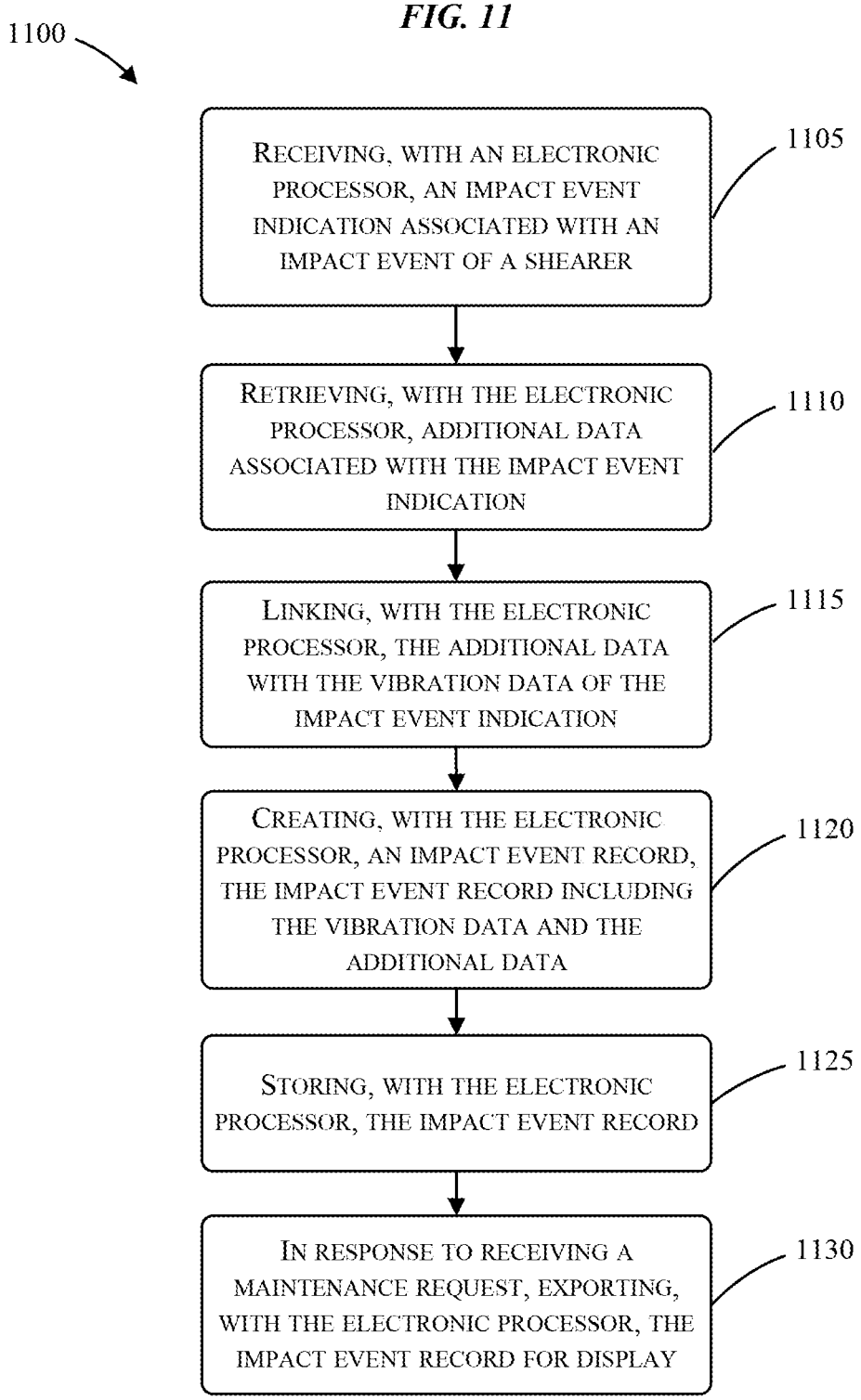
FIG. 11 is a flowchart of another method for monitoring a longwall mining system using the underground longwall control system of FIG. 7 according to some embodiments.

FIG. 11 is a flowchart of a method 1100 for monitoring the longwall mining system 105 by providing an impact event record of the shearer 120 according to some embodiments. As illustrated in FIG. 11, the method 1100 includes receiving, with the electronic processor 820, an impact event indication associated with an impact event of the shearer 120 (at block 1105). The impact event indication may be based on vibration data collected by one or more of the vibration sensors 817 mounted to the shearer 120. Accordingly, in some embodiments, the impact event indication includes the vibration data used by the electronic processor 820 to detect the impact event associated with the impact event indication. In some embodiments, the electronic processor 820 generates the impact event indication in a similar manner as described with respect to the method 1000 of FIG. 10.

In response to receiving the impact event indication, the electronic processor 820 retrieves additional data associated with the impact event indication (at block 1110). The additional data may provide additional information or detail relating to the impact event. For example, the additional data may include a time of day when the impact event occurred, a geographical location of the shearer 120 when the impact event occurred, an operator characteristic when the impact event occurred (for example, an operator identification), an operational state of the shearer 120 when the impact event occurred, a cutting parameter of the shearer 120 when the impact event occurred, a position within a cutting sequence when the impact event occurred, a roof support position along the wall at which the impact event occurred (e.g., the impact event occurred when the cutter drum was at roof support X of the N total roof supports 115), and the like. In some embodiments, the electronic processor 820 retrieves the additional data from the memory 825 of the controller 805. For example, the additional data may be received (by the electronic processor 820) from one or more of the other sensors 819 and stored in the memory 825. Alternatively or in addition, the electronic processor 820 may retrieve the additional data from other components or systems associated with the shearer 120.

The electronic processor 820 may link (or associate) the additional data with the vibration data of the impact event indication (at block 1115) and create an impact event record (at block 1120). Accordingly, in some embodiments, the impact event record includes the linked vibration data and additional data. Alternatively or in addition, in some embodiments, the impact event record includes a severity level of the impact event. After creating the impact event record (at block 1120), the electronic processor 820 may store the impact event record (at block 1125). The electronic processor 820 may store the impact event record in the memory 825 of the controller 805.

In some embodiments, the electronic processor 820 stores (or adds) the impact event record to an impact event database stored in the memory 825 of the controller 805. The impact event database may include multiple impact event records (as individual entries to the impact event database). Accordingly, in some embodiments, when the electronic processor 820 receives a new impact event indication, the electronic processor 820 creates a new impact event record (including the associated vibration data and additional data) and adds the new impact event record to the impact event database stored in the memory 825. Each impact event record may include an associated identifier (e.g., a serial number, alphanumeric value, date-time stamp, or other unique identifier) to enable distinguishing between records.

After storing the impact event record, the electronic processor 820 may export the impact event record for display (at block 1130). In some embodiments, the electronic processor 820 exports the impact event record in response to receiving a request, such as a maintenance request. The electronic processor 820 may receive the request from a device external to the shearer 120 (e.g., the operator remote device or a computer device of the mine monitoring system 110). In response to receiving the impact event record, the device external to the shearer 120 may display the impact event record via a display device or otherwise make the impact event record available to a user. In some embodiments, the electronic processor 820 may export a plurality of impact event records (e.g., the most recent impact records up to a predetermined number (e.g., 5, 10, or 25), each impact event from a particular time period (e.g., 12 hours, 24 hours, 1 week, or 1 month)) or may export each impact event record stored in the impact event database.

Such event records enable an operator and other mine personnel to be better informed regarding operation of the longwall mining system 105 and to take corrective action in response to such control instructions. Without such monitoring or notifications, an operator and other mine personnel may not be aware that the shearer 120 is encountering hard material or stone, or otherwise experiencing impacts that can reduce the lifetime of the mining equipment or reduce the effectiveness of the mining equipment. For example, it may be difficult for an operator to perceive or determine when vibration experienced by the longwall mining system 105 changes from typical vibration for which the shearer 120 is designed to experience to excessive vibration that could damage the shearer 120. Automated vibration sensing and impact event detection as described with respect to the method 1000, however, may improve the identification of impact events. Additionally, mine supervisors may be better informed to identify operators that are more likely to encounter such impact events and provide additional training to these operators to reduce wear on the longwall mining system 105. Additionally, by linking the impact events to additional information, the event records can provide further insight into the mine (e.g., information related to the quality or makeup of the seam), the mine operator (e.g., skill level or aggressiveness of the operator), the wear and life expectancy of the shearer 120 (e.g., whether the shearer 120 has been subject to many impact events and may need maintenance sooner than otherwise expected), and potential abusive operation of the shearer 120, which could be relevant for warranty determinations. Such information would otherwise be difficult to detect, log, and analyze. Further advantages and benefits are also provided by the method 1100 and not discussed herein.

Figure 12:
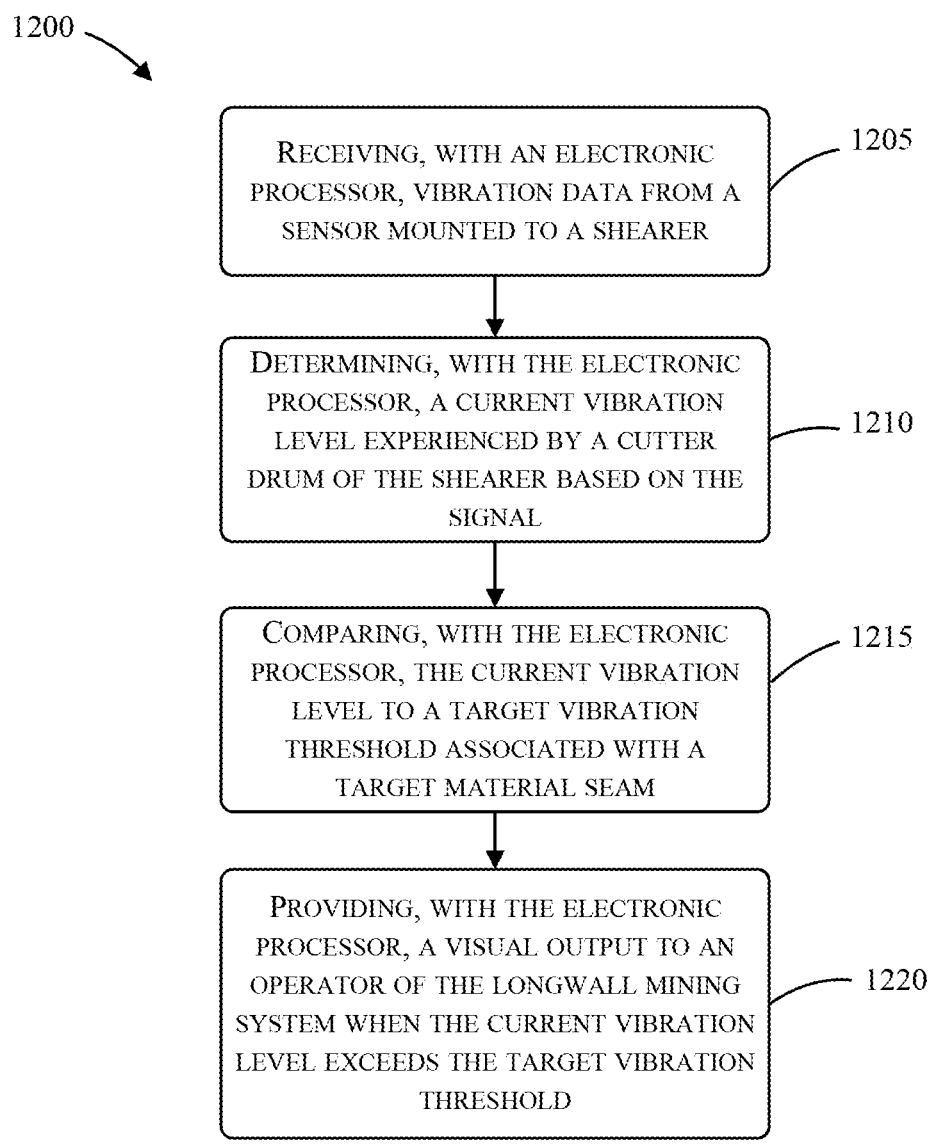
FIG. 12 is a flowchart of another method for monitoring a longwall mining system using the underground longwall control system of FIG. 7 according to some embodiments.

FIG. 12 is a flowchart of a method 1200 for monitoring the longwall mining system 105 by maintaining a cutter drum 525, 530 within a target material seam according to some embodiments. As seen in FIG. 12, the method 1200 includes receiving, with the electronic processor 820, vibration data from a sensor mounted to the shearer 120 (at block 1205), determining, with the electronic processor 820, a current vibration level associated with the shearer 120 based on the vibration data (at block 1210). With respect to method 1200, the electronic processor 820 may perform blocks 1205-1210 in a similar manner as described above with respect to blocks 905-910 of method 900 illustrated in FIG. 9.

As illustrated in FIG. 12, the method 1200 also includes comparing, with the electronic processor 820, the current vibration level to a target vibration threshold associated with a target material seam (at block 1215). The target vibration threshold may be a known or expected vibration level associated with a material to be mined. Accordingly, the electronic processor 820 may set or define the target vibration threshold based on a known or expected vibration level associated with the material of the target material seam to be mined by the shearer 120.

The electronic processor 820 compares the current vibration level to the target vibration threshold in order to determine whether the current vibration level exceeds the target vibration threshold. When the current vibration level exceeds the target vibration threshold, the electronic processor 820 provides a visual output to an operator of the longwall mining system 105 (at block 1220). The target vibration threshold is selected such that, at least in general, the current vibration level exceeds the target vibration threshold when the shearer (i.e., the cutter drum 525, 530) cuts outside of the target material seam. In some embodiments, the electronic processor 820 provides the visual output to the operator in real time (or near real time) during operation of the longwall mining system 105 (i.e., the shearer 120). In such embodiments, the electronic processor 820 may transmit (or provide) the visual output to a device external to the shearer 120, such as the operator remote device used by an operator to control the longwall mining system 105 (i.e., the shearer 120). The visual output may be displayed to the operator via a display device of the remote device.

Figure 13:
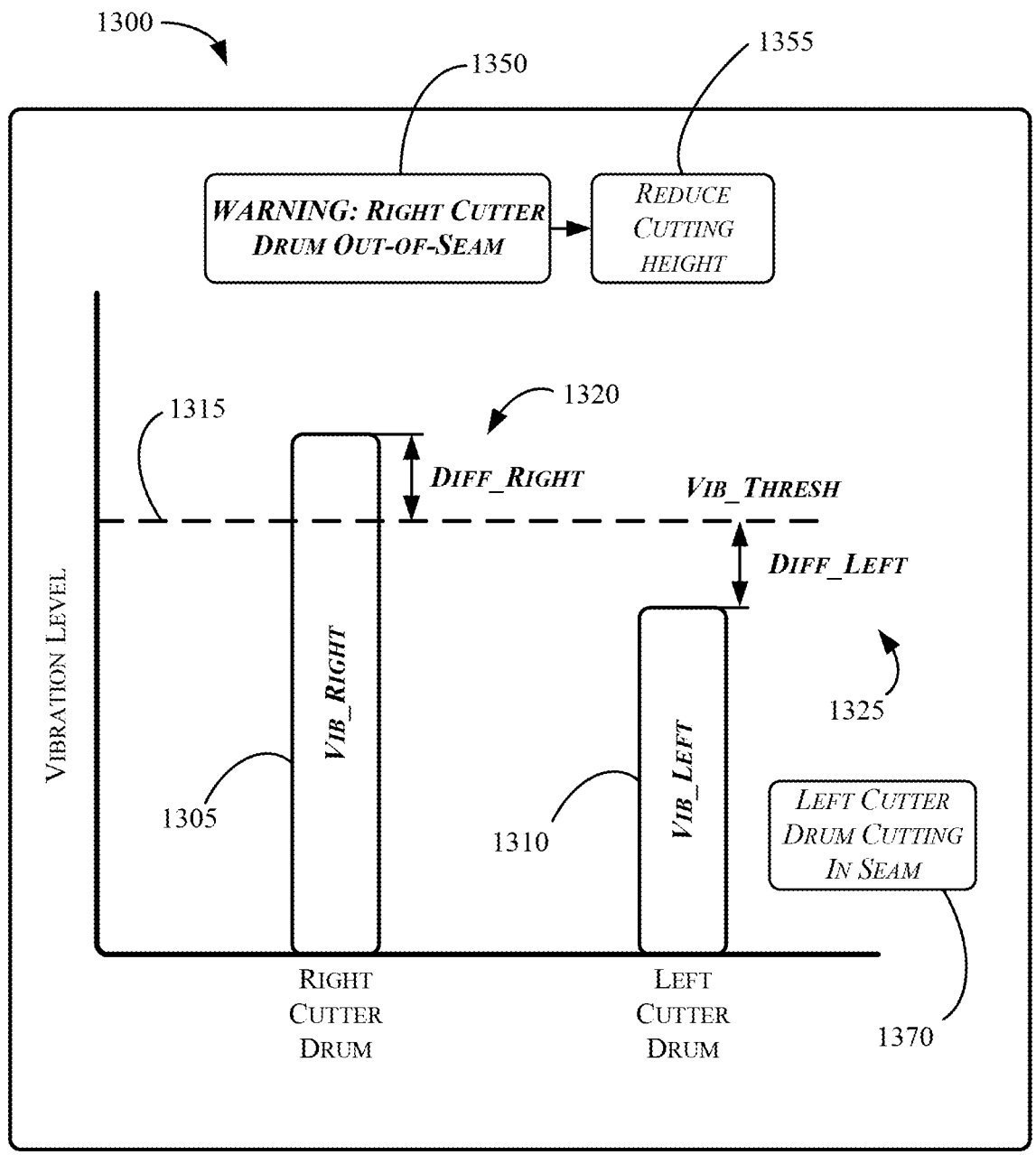
FIG. 13 illustrates a visual output according to some embodiments.

Accordingly, in some embodiments, the visual output provides a graphical representation of the current vibration level in relation to the target vibration threshold. For example, FIG. 13 illustrates an exemplary visual output 1300 according to some embodiments. In the example illustrated in FIG. 13, the visual output 1300 provides a graphical representation of the current vibration level in relation to the target vibration threshold in bar graph form. The visual output 1300 indicates a current vibration level of the right cutter drum 525 and a current vibration level of the left cutter drum 530. As illustrated in FIG. 13, the current vibration level for the right cutter drum 525 and the left cutter drum 530 are visually depicted by a first bar 1305 and a second bar 1310, respectively, where the height of the first bar 1305 and the second bar 1310 represents the current vibration level of the right cutter drum 525 and the left cutter drum 530, respectively. Alternatively or in addition, the current vibration level for the right cutter drum 525 and the left cutter drum 530 may be depicted by a current vibration level indication, such as a numerical value, associated with the first bar 1305 and the second bar 1310, respectively. For example, as illustrated in FIG. 13, the current vibration level experienced by the right cutter drum 525 may be positioned within the first bar 1305 of the visual output 1300 (represented in FIG. 13 as "Vib_Right"). Similarly, the current vibration level experienced by the left cutter drum 530 may be positioned within the second bar 1310 of the visual output 1300 (represented in FIG. 13 as "Vib_Left").

The visual output 1300 also provides a visual indication of the vibration threshold (or the target vibration threshold). For example, as illustrated in FIG. 13, the vibration threshold is depicted as a dashed line 1315. Alternatively or in addition, the visual output 1300 may include the vibration threshold as a numerical value. For example, as illustrated in FIG. 13, the visual output 1300 includes the vibration threshold as a numerical value (represented in FIG. 13 as "Vib_Thresh") associated with the dashed line 1315.

In some embodiments, the visual output 1300 indicates a difference between the current vibration level and the vibration threshold. For example, as illustrated in FIG. 13, the visual output 1300 includes a first difference indication 1320 for the right cutter drum 525 (represented in FIG. 13 as "Diff_Right") and a second difference indication 1325 for the left cutter drum 530 (represented in FIG. 13 as "Diff_Left"). As seen in FIG. 13, the first difference indication 1320 indicates that the difference between the current vibration level of the right cutter drum 525 and the vibration threshold is Diff_Right. Accordingly, the first difference indication 1320 indicates that the current vibration level experienced by the right cutter drum 525 exceeds the vibration threshold by Diff_Right. As also seen in FIG. 13, the second difference indication 1325 indicates that the difference between the current vibration level of the left cutter drum 530 and the vibration threshold is Diff_Left. Accordingly, the second difference indication 1325 indicates that the current vibration level experienced by the left cutter drum 530 is below the vibration threshold by Diff_Left.

In some embodiments, the visual output 1300 indicates whether a component of the shearer 120 is cutting in-seam, cutting out-of-seam, approaching the seam, or a combination thereof by modifying a characteristic of the visual output 1300, such as a color or an animation. For example, the first bar 1305 may be a first color (for example, red) to indicate that the right cutter drum 525 is cutting out-of-seam, while the second bar 1310 may be a second color (for example, green) to indicate that the left cutter drum 530 is cutting in seam. However, when the current vibration level experienced by the left cutter drum 530 approaches the vibration threshold, the second bar 1310 may change to a third color (for example, yellow) to indicate that the left cutter drum 530 is approaching the seam. As another example, the first bar 1305 may perform an animation, such as a flash or pulse, to indicate that the right cutter drum 525 is cutting out-of-seam.

The visual output 1300 may indicate that one or more of the cutter drums 525, 530 (or another component of the shearer 120) is cutting outside of the target material seam (i.e., is cutting out-of-seam). For example, as illustrated in FIG. 13, the visual output 1300 includes a warning indication 1350 indicating that the right cutter drum 525 is cutting out-of-seam. In some embodiments, the visual output 1300 includes an instruction for adjusting one or more of the cutting parameters of the cutter drum 525, 530 for cutting within the target material seam. In other words, the visual output 1300 instruct an operator regarding how to return the shearer 120 to cutting in seam. For example, the visual output 1300 may include an instruction to reduce or increase a cutting speed of the cutter drum 525, 530, reduce or increase a cutting height of the cutter drum, or a combination thereof. As seen in FIG. 13, the visual output 1300 includes an instruction 1355 to reduce a cutting height of the right cutter drum 525. In some embodiments, the instruction included in the visual output 1300 may include a specific cutting parameter value for controlling the shearer 120, such as a suggested cutting speed value or a suggested cutting height value.

Alternatively or in addition, in some embodiments, the electronic processor 820 provides an additional visual output to the operator of the longwall mining system 105 when the current vibration level does not exceed the target vibration threshold. The current vibration level does not exceed the target vibration threshold when the cutter drum 525, 530 of the shearer 120 cuts within the target material seam. In such embodiments, the additional visual output indicates that the shearer 120 (i.e., the cutter drum 525, 530) cuts within the target material seam. In some embodiments, the additional visual output is included within the visual output 1300. For example, as illustrated in FIG. 13, the visual output 1300 includes an additional visual output 1370. As seen in FIG. 13, the additional visual output 1370 indicates that the left cutter drum 530 is cutting in seam.

The various methods described above are described as including one or more functions performed by the electronic processor 810. These functions may also be described as being carried out by the electronic controller 805, which includes the electronic processor 810 and the memory 825, among other components.

Thus, embodiments described herein provide, among other things, systems and methods for controlling and monitoring a longwall mining system based on vibration data. Various features and advantages of the embodiments described herein are set forth in the following claims.

What is claimed is:

1. A longwall mining system, the system comprising:
    a shearer including a cutter drum;
    a sensor mounted to the shearer; and
    an electronic controller including a processor and a memory, the electronic controller communicatively coupled to the sensor, and the electronic controller configured to
        receive an impact event indication associated with an impact event of the cutter drum, the impact event indication based on vibration data collected by the sensor,
        retrieve additional data associated with the impact event indication,
        link the additional data with the vibration data of the impact event indication,
        create an impact event record, the impact event record including the vibration data and the additional data,
        store the impact event record, and
        in response to receiving a maintenance request, export the impact event record for display.

2. The system of claim 1, wherein the sensor is mounted to at least one selected from a group consisting of a ranging arm of the cutter drum and within a control housing of the shearer.

3. The system of claim 1, wherein the electronic controller is configured to output a control instruction to an operator of the longwall mining system based on the impact event indication.

4. The system of claim 3, wherein the control instruction includes an instruction to at least one selected from a group consisting of reduce a cutting speed of the cutter drum and adjust a cutting height of the cutter drum.

5. The system of claim 1, wherein the impact event record indicates a severity level of the impact event.

6. The system of claim 1, wherein the additional data includes at least one selected from a group consisting of a time of day when the impact event occurred, a geographical location of the shearer when the impact event occurred, a roof support position at which the impact event occurred, and an operator characteristic.

7. The system of claim 1, wherein the additional data includes at least one selected from a group consisting of an operational state of the shearer when the impact event occurred, a cutting parameter when the impact event occurred, and a position within a cutting sequence when the impact event occurred.

8. A method of monitoring a longwall mining system, the method comprising:
receiving, with an electronic controller, an impact event indication associated with an impact event of a cutter drum of a shearer, the impact event indication based on vibration data collected by a sensor mounted to the shearer;
retrieving, with the electronic controller, additional data associated with the impact event indication;
linking, with the electronic controller, the additional data with the vibration data of the impact event indication;
creating, with the electronic controller, an impact event record, the impact event record including the vibration data and the additional data;
storing, with the electronic controller, the impact event record; and
in response to receiving a maintenance request, exporting, with the electronic controller, the impact event record for display.

9. The method of claim 8, further comprising:
outputting a control instruction to an operator of the longwall mining system based on the impact event indication.

10. The method of claim 9, wherein outputting the control instruction includes outputting an instruction to at least one selected from a group consisting of reduce a cutting speed of the cutter drum and adjust a cutting height of the cutter drum.

11. The method of claim 8, wherein creating the impact event record includes creating an impact event record indicating a severity level of the impact event.

12. The method of claim 8, wherein retrieving the additional data includes retrieving at least one selected from a group consisting of a time of day when the impact event occurred, a geographical location of the shearer when the impact event occurred, a roof support position at which the impact event occurred, and an operator characteristic.

13. The method of claim 8, wherein retrieving the additional data includes retrieving at least one selected from a group consisting of an operational state of the shearer when the impact event occurred, a cutting parameter when the impact event occurred, and a position within a cutting sequence when the impact event occurred.

* * * * *